(12) United States Patent
Ueda et al.

(10) Patent No.: US 11,310,474 B2
(45) Date of Patent: *Apr. 19, 2022

(54) COMPUTER-READABLE NON-TRANSITORY STORAGE MEDIUM HAVING STORED THEREIN INFORMATION PROCESSING PROGRAM, INFORMATION PROCESSING METHOD, INFORMATION PROCESSING SYSTEM, AND INFORMATION PROCESSING APPARATUS

(71) Applicant: NINTENDO CO., LTD., Kyoto (JP)

(72) Inventors: Hiroshi Ueda, Kyoto (JP); Kazuhide Ueda, Kyoto (JP); Norihiro Morita, Kyoto (JP); Arisa Kitani, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,065

(22) Filed: May 25, 2021

(65) Prior Publication Data

US 2021/0281811 A1    Sep. 9, 2021

Related U.S. Application Data

(60) Continuation of application No. 15/931,158, filed on May 13, 2020, now Pat. No. 11,050,989, which is a
(Continued)

(30) Foreign Application Priority Data

Jan. 10, 2017    (JP) .............................. JP2017-002093

(51) Int. Cl.
*H04N 13/111*    (2018.01)
*A63F 13/5378*    (2014.01)
(Continued)

(52) U.S. Cl.
CPC ........ *H04N 13/111* (2018.05); *A63F 13/5378* (2014.09); *G01P 15/18* (2013.01);
(Continued)

(58) Field of Classification Search
CPC ....... H04N 13/11; A63F 13/5378; G06T 7/73; G06T 7/20; G06T 15/04; G06T 17/20; G01P 15/18
(Continued)

(56) References Cited

U.S. PATENT DOCUMENTS

2003/0166413 A1    9/2003   Hayashida
2003/0216177 A1    11/2003  Aonuma et al.
(Continued)

FOREIGN PATENT DOCUMENTS

| EP | 1132120 | 9/2001 |
|---|---|---|
| JP | H0981772 | 3/1997 |
| JP | 2009-056181 | 3/2009 |

OTHER PUBLICATIONS

Search Report dated Apr. 10, 2018, issued in EP Patent Application No. 17204385.3 (6 pages).

*Primary Examiner* — On S Mung
(74) *Attorney, Agent, or Firm* — Nixon & Vanderhye P.C.

(57) ABSTRACT

A first image is generated by imaging a first three-dimensional virtual space including a predetermined object by a first virtual camera. In addition, a map object formed by a three-dimensional model corresponding to the first three-dimensional virtual space is generated, and an indicator object indicating the position of a predetermined object is placed on the map object. Then, a second image is generated by imaging the map object by a second virtual camera. At this time, the second image is generated such that, regarding the indicator object placed on the map object, the display manners of a part hidden by the map object and a part not
(Continued)

hidden by the map object as seen from the second virtual camera are different from each other.

14 Claims, 21 Drawing Sheets

Related U.S. Application Data division of application No. 15/827,360, filed on Nov. 30, 2017, now Pat. No. 10,694,163.

(51) Int. Cl.
*G06T 7/73* (2017.01)
*G01P 15/18* (2013.01)
*G06T 1/00* (2006.01)
*G06T 7/20* (2017.01)
*G06T 15/04* (2011.01)
*G06T 17/20* (2006.01)
*G06T 19/20* (2011.01)

(52) U.S. Cl.
CPC .............. *G06T 1/0007* (2013.01); *G06T 7/20* (2013.01); *G06T 7/73* (2017.01); *G06T 15/04* (2013.01); *G06T 17/20* (2013.01); *G06T 19/20* (2013.01); *G06T 2219/2012* (2013.01)

(58) Field of Classification Search
USPC .......................................................... 348/47
See application file for complete search history.

(56) References Cited

U.S. PATENT DOCUMENTS

| | | |
|---|---|---|
| 2009/0104990 A1 | 4/2009 | Tsujino et al. |
| 2011/0074769 A1 | 3/2011 | Takayama |
| 2011/0304620 A1 | 12/2011 | Yamada |
| 2012/0075430 A1 | 3/2012 | Ito |

COMPUTER-READABLE NON-TRANSITORY STORAGE MEDIUM HAVING STORED THEREIN INFORMATION PROCESSING PROGRAM, INFORMATION PROCESSING METHOD, INFORMATION PROCESSING SYSTEM, AND INFORMATION PROCESSING APPARATUS

CROSS REFERENCE TO RELATED APPLICATION

This application is a continuation of U.S. application Ser. No. 15/931,158, filed May 13, 2020, now allowed; which is a divisional of U.S. application Ser. No. 15/827,360, filed Nov. 30, 2017, now U.S. Pat. No. 10,694,163, issued Jun. 23, 2020; and claims priority to Japanese Patent Application No. 2017-002093, filed on Jan. 10, 2017; the entire contents of each being incorporated herein by reference.

FIELD

The exemplary embodiments relate to a computer-readable non-transitory storage medium having stored therein an information processing program to be executed by a computer of an information processing apparatus for executing an information process on the basis of user's operation to an operation section and displaying an image on a display section, and in particular, relates to a computer-readable non-transitory storage medium having stored therein an information processing program for displaying a map image.

BACKGROUND AND SUMMARY

Conventionally, there is known a technique of displaying a map showing an overhead view of a whole game world formed in a three-dimensional virtual space.

In the above technique, the map is displayed so as to be entirely included within a screen, and thus is displayed on a small scale. Therefore, it is difficult for a player to see a detailed part (terrain) on the map. On the map, an image (for example, icon) for indicating the position of a player may be displayed. In general, this image is displayed in a relatively larger size as compared to the size of a player character in the virtual space. Therefore, it is also difficult to recognize the accurate position of the player character. Further, since the overhead-view map is a two-dimensional map while the virtual space is a three-dimensional space, there is also a problem that it is difficult to grasp information about height direction.

Therefore, an object of the exemplary embodiments is to provide a map screen that allows information in a virtual space to be grasped more accurately.

Configuration examples for achieving the above object will be shown below.

One configuration example is a computer-readable non-transitory storage medium having stored therein an information processing program to be executed by a computer of an information processing apparatus which executes an information process on the basis of user's operation to an operation section and displays an image on a display section, the information processing program causing the computer to execute a first image generation step, a map object generation step, an indicator object placing step, a second image generation step, and a display control step. In the first image generation step, a first image is generated by imaging a first three-dimensional virtual space including a predetermined object by a first virtual camera. In the map object generation step, a map object representing the first three-dimensional virtual space and formed by a three-dimensional model corresponding to the first three-dimensional virtual space is generated and placed in a second three-dimensional virtual space. In the indicator object placing step, an indicator object indicating a position of the predetermined object in the first three-dimensional virtual space is placed on the map object. In the second image generation step, a second image is generated by imaging the second three-dimensional virtual space including the map object on which the indicator object is placed, by a second virtual camera. In the display control step, the first image and the second image are displayed on the display section. In the second image generation step, the second image is generated such that, regarding the indicator object placed on the map object, display manners of a part hidden by the map object and a part not hidden by the map object as seen from the second virtual camera are different from each other.

According to the above configuration example, it is possible to provide a map screen that allows the player to easily grasp the conditions in the virtual space, such as the positional relationship of an object in the virtual space.

In another configuration example, an area of the indicator object on the second image may be larger than an area occupied by the predetermined object corresponding to the indicator object on an image of an overhead view of the first three-dimensional virtual space.

According to the above configuration example, it is possible to allow the player to easily grasp the position of the player object on the map screen.

In another configuration example, the computer may be further caused to execute a second virtual camera operating step of controlling a position and/or an imaging direction of the second virtual camera on the basis of user's operation to the operation section. The computer may be further caused to execute a first virtual camera operating step of controlling an imaging direction of the first virtual camera on the basis of user's operation to the operation section, and the control of the second virtual camera in the second virtual camera operating step and the control of the first virtual camera in the first virtual camera operating step may be both executed on the basis of the same user's operation to the operation section. The control of the second virtual camera in the second virtual camera operating step and the control of the first virtual camera in the first virtual camera operating step may be executed simultaneously.

According to the above configuration example, it becomes possible to control the virtual camera even while the map screen is being displayed, whereby convenience for the player can be enhanced. In addition, controls for both of the virtual camera for game screen and the virtual camera for map screen can be performed through one operation, and thus convenience of the player can be enhanced.

In another configuration example, the computer may be further caused to execute a cursor display step of displaying a cursor image indicating a designating position on the second image so as to be superimposed on the second image, on the basis of user's operation to the operation section, and the control of the second virtual camera and control of the designating position of the cursor, based on user's operation to the operation section, may be executed simultaneously.

According to the above configuration example, a predetermined position on the map screen can be designated, and thus it becomes possible to further execute a predetermined process based on the position designation. In addition, operation of the second virtual camera can be also performed at the same time, whereby convenience for the player can be enhanced.

In another configuration example, the information processing apparatus may further include, as the operation section, an inertia sensor for detecting a motion applied to the information processing apparatus itself, and in the second virtual camera operating step, the control of the second virtual camera may be executed on the basis of output from the inertia sensor.

According to the above configuration example, it becomes possible to perform intuitive operation, whereby convenience for the player can be enhanced.

In another configuration example, in the second image generation step, the second image may be generated such that a parameter relevant to at least one of hue, brightness, and saturation of a surface part of the map object is changed in accordance with a height of the surface part on the map object.

According to the above configuration example, it is possible to provide a map image that allows the player to easily grasp the positional relationship in the height direction.

In another configuration example, in the display control step, the first image and the second image may be simultaneously displayed on the display section in accordance with a predetermined user's operation. Further, in the display control step, the first image and the second image may be simultaneously displayed by the second image being superimposed on the first image in accordance with the predetermined user's operation.

According to the above configuration example, it is possible to allow the player to perform such an operation of, for example, displaying the map screen and then moving the player object in the first three-dimensional virtual space while viewing the map screen. Thus, convenience for the player can be enhanced.

In another configuration example, in the first image generation step, an image obtained by imaging the first three-dimensional virtual space by perspective projection may be generated as the first image, and in the second image generation step, an image obtained by imaging the second three-dimensional virtual space by orthogonal projection may be generated as the second image.

According to the above configuration example, it is possible to provide a game screen with a realistic sensation, and provide a map image that allows the player to easily grasp the state in the virtual space (e.g., ratio of areas on the map image).

Another configuration example is a computer-readable non-transitory storage medium having stored therein an information processing program to be executed by a computer of an information processing apparatus which executes an information process on the basis of user's operation to an operation section and displays an image on a display section, the information processing program causing the computer to execute a first image generation step, a map object generation step, an indicator object placing step, a virtual camera control step, a second image generation step, and a display control step. In the first image generation step, a first image is generated by imaging a first three-dimensional virtual space including a predetermined object by a first virtual camera. In the map object generation step, a map object representing the first three-dimensional virtual space and formed by a three-dimensional model corresponding to the first three-dimensional virtual space is generated and placed in a second three-dimensional virtual space. In the indicator object placing step, an indicator object indicating a position of the predetermined object in the first three-dimensional virtual space is placed on the map object. In the virtual camera control step, a position and/or a direction of a second virtual camera for imaging the second three-dimensional virtual space including the map object on which the indicator object is placed, is controlled on the basis of user's operation to the operation section. In the second image generation step, a second image is generated by imaging the second three-dimensional virtual space by a second virtual camera. In the display control step, the first image and the second image are displayed on the display section.

According to the above configuration example, for example, since the map image is displayed and the virtual camera imaging the map image can be controlled, it is possible to provide a map image that allows the player to easily grasp the conditions in the virtual space such as the positional relationship of an object in the virtual space.

The exemplary embodiments can provide a map image that allows information in a virtual space to be grasped more accurately.

DETAILED DESCRIPTION OF NON-LIMITING EXAMPLE EMBODIMENTS

Hereinafter, one exemplary embodiment will be described.

Figure 1:
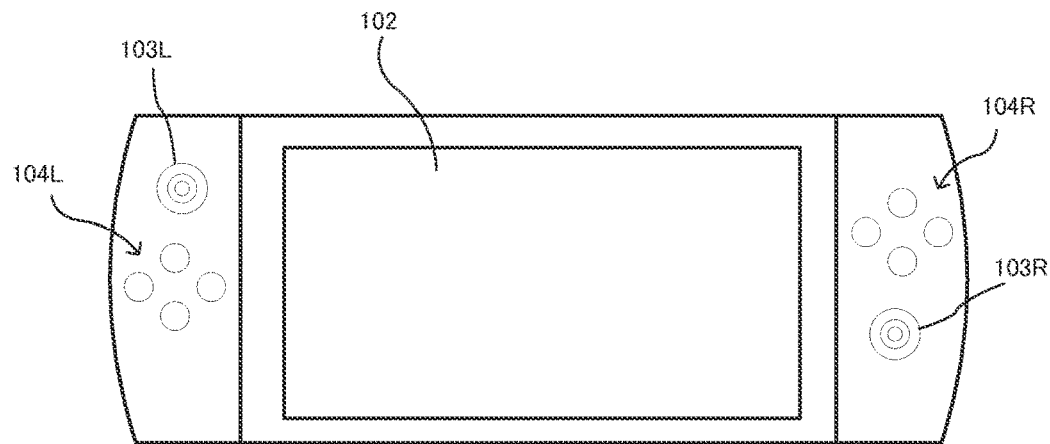
FIG. 1 is a schematic view showing a non-limiting example of the outer appearance of a game apparatus 101.

FIG. 1 is a schematic view showing the outer appearance of a game apparatus 101 which is an example of an information processing apparatus according to the exemplary embodiment. The game apparatus 101 at least includes a touch display 102, a left analog stick 103L, a right analog stick 103R, left operation buttons 104L, and right operation buttons 104R. The touch display 102 is configured by unifying a touch panel and a liquid crystal display device, and is located at the center of the game apparatus 101. The left analog stick 103L is located at the upper left on the surface of the game apparatus 101. The right analog stick 103R is located at the lower right on the surface. The left operation buttons 104L are operation buttons of a digital type. Four left operation buttons 104L are provided in a cross shape at the left of the game apparatus 101, on the lower side of the left analog stick 103L. Similarly, four right operation buttons 104R, which are digital operation buttons, are provided in a cross shape at the right of the game apparatus 101, on the upper side of the right analog stick 103R. It is noted that, in this game, the left operation buttons 104L are used as a so-called cross key, and the right operation buttons 104R are used as so-called ABXY buttons. Although not shown, the game apparatus 101 also includes an L button, an R button, a ZL button, and a ZR button. For example, the L button is provided at the upper left on the housing side surface of the game apparatus 101, and the ZL button is provided at the upper left on a part from the housing side surface to the back surface. For example, the R button is provided at the upper right on the housing side surface of the game apparatus 101, and the ZR button is provided at the upper right on a part from the housing side surface to the back surface.

Figure 2:
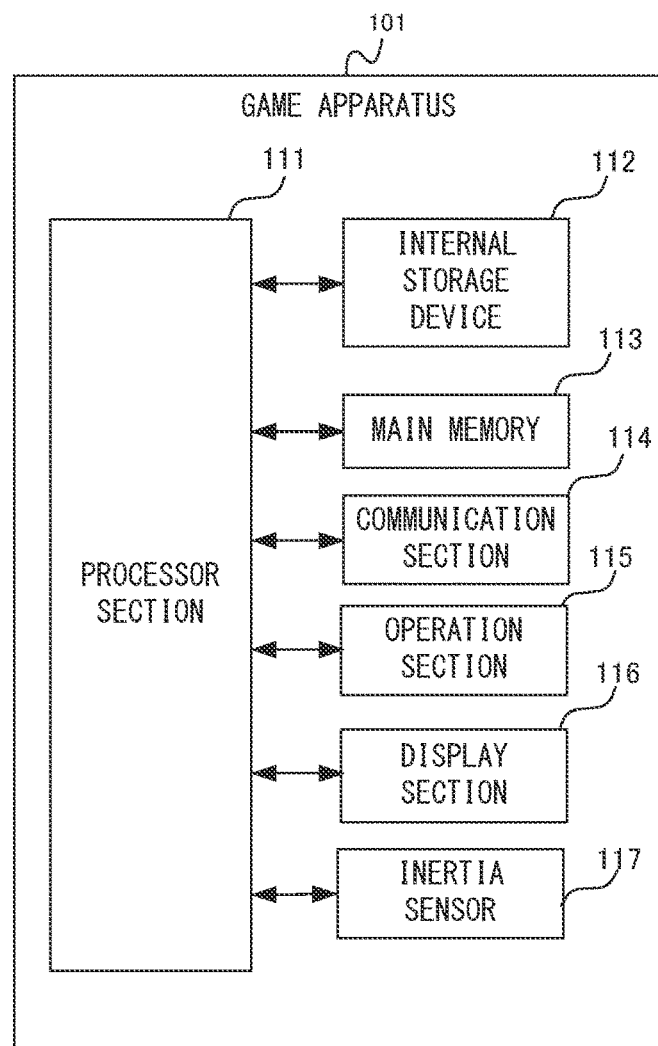
FIG. 2 is a function block diagram showing a non-limiting example of the game apparatus 101.

FIG. 2 is a function block diagram of the game apparatus 101. In FIG. 2, the game apparatus 101 includes a processor section 111, an internal storage device 112, a main memory 113, a communication section 114, an operation section 115, a display section 116, and an inertia sensor 117. The processor section 111 executes an information process described later or executes a system program (not shown) for controlling the overall operation of the game apparatus 101, thereby controlling operation of the game apparatus 101. It is noted that the processor section 111 may include a single processor or include a plurality of processors. The internal storage device 112 stores various programs to be executed by the processor section 111 and various data to be used in the programs. The internal storage device 112 is, for example, a flash EEPROM or a hard disk device. The main memory 113 temporarily stores a computer program and information. The communication section 114 is capable of establishing connection with a network via wired or wireless communication, and transmitting and receiving predetermined data to and from a predetermined server or another game apparatus. The operation section 115 is, for example, an input device for receiving operation from a user. In the exemplary embodiment, the analog sticks 103L, 103R, the left operation buttons 104L, the right operation buttons 104R, and the touch panel part of the touch display 102 correspond to the operation section 115. The L button, the R button, the ZL button, and the ZR button also correspond to the operation section 115. The display section 116 corresponds to the touch display 102. The inertia sensor 117 is a sensor for detecting movement applied to the game apparatus 101 itself. Specifically, the inertia sensor 117 is an acceleration sensor or an angular velocity sensor. The acceleration sensor detects the magnitudes of accelerations (linear accelerations) in the straight-line directions along the three axial (x, y, z axes) directions. The angular velocity sensor detects angular velocities on the three axes (x, y, z axes). In the exemplary embodiment, the inertia sensor 117 functions as a part of the operation section 115.

Figure 3:
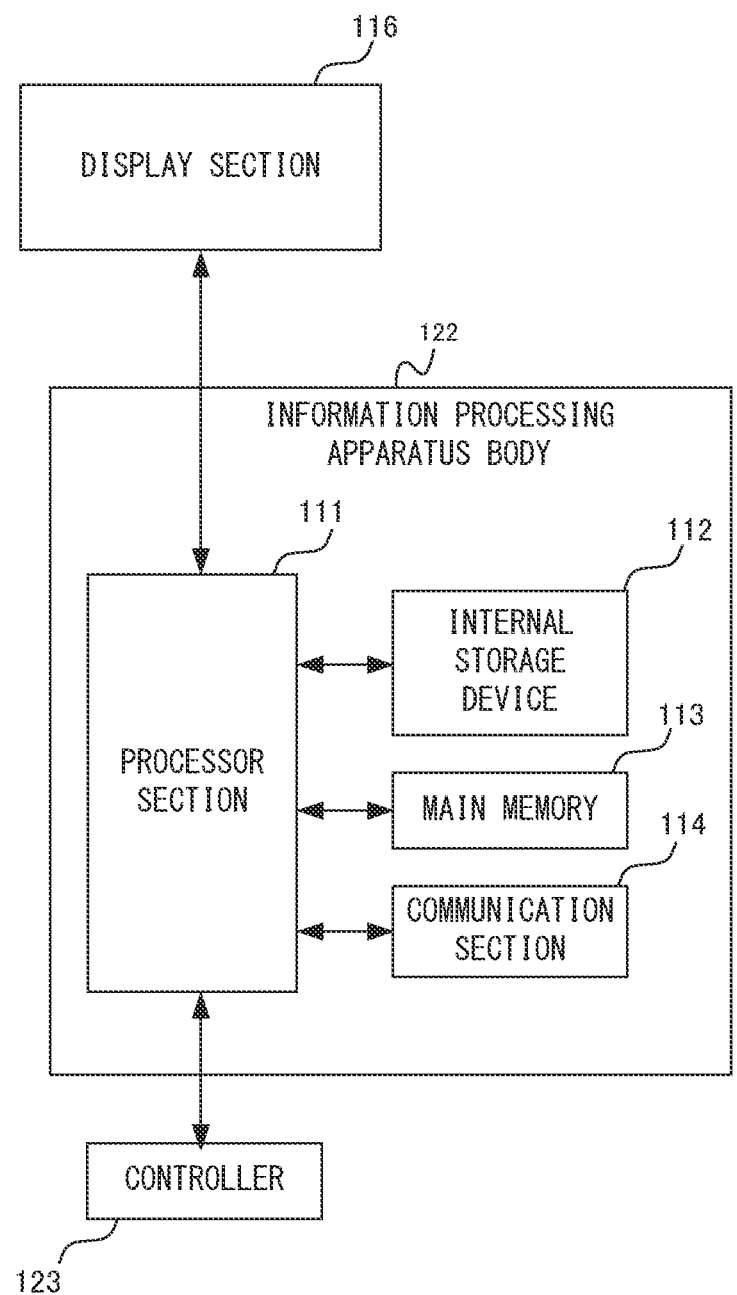
FIG. 3 is a function block diagram showing a non-limiting example of a stationary game apparatus.

In the exemplary embodiment, an example in which a game process as described later is executed by the game apparatus 101 having the operation section and the display section unified with each other as shown in FIG. 1 and FIG. 2, will be described. It is noted that the information processing apparatus is not limited to the game apparatus 101 as described above. The process according to the following exemplary embodiment is also applicable to an information processing system configured such that an information processing apparatus body, the operation section, and the display section are separated from each other, for example. An example of such an information processing system is a stationary game apparatus. FIG. 3 shows an example of a function block diagram of such a stationary game apparatus. In FIG. 3, a display section 116 and a controller 123 are connected to the information processing apparatus (game apparatus) body 122. For example, a television corresponds to the display section 116. The controller 123 is, for example, a game controller, and corresponds to the operation section 115 described above. The controller may include the aforementioned inertia sensor 117. The connection between the information processing apparatus body 122 and the display section 116 may be wired connection or wireless connection. Similarly, the connection between the information processing apparatus body 122 and the controller 123 may be wired connection or wireless connection. In this configuration, for example, a plurality of controllers 123 may be allowed to be connected to the information processing apparatus body 122.

Next, the outline of operation in the game process which is an example of an information process executed by the information processing system according to the exemplary embodiment will be described. The game process according to the exemplary embodiment is a territory occupation game of a team battle type. Specifically, this game is a so-called third-person-shooter (TPS) game in which each team is composed of four players and two teams compete with each other. In the exemplary embodiment, it is assumed that eight players respectively operate the game apparatuses 101 and are separated into two teams to perform an online competition game using eight game apparatuses 101. In this game, each team is to expand its territory in a first three-dimensional virtual space (hereinafter, virtual game space), and the team that has acquired more territory at the time when the time limit has been reached, wins. In this game, the territory can be expanded by painting a field composing the virtual game space with an "ink (object)". Each player operates the own player object to paint a ground surface or a wall in the virtual game space with ink of a color of the own team, and the team that has eventually painted a larger area wins. It is noted that the above number of players is merely an example, and the game may be played by any number of players.

(Normal Game Screen)

Figure 4:
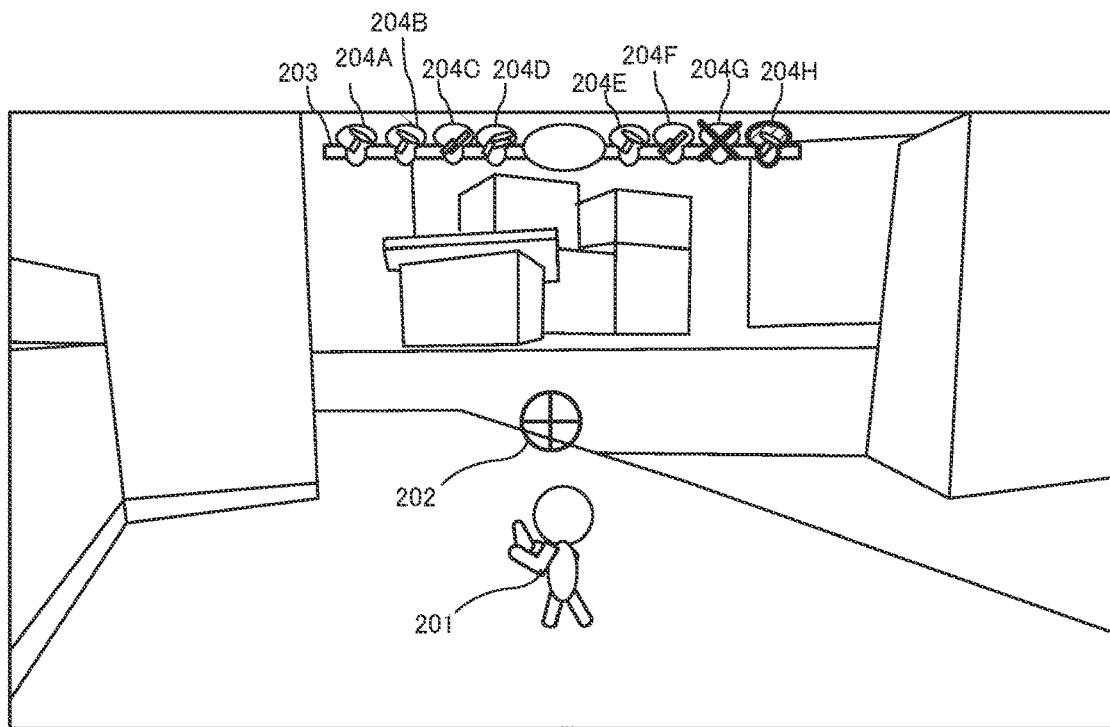
FIG. 4 shows a non-limiting example of a game screen according to the exemplary embodiment.

Hereinafter, the outline of this game will be described using a screen example. FIG. 4 shows an example of a game screen displayed on the display section 116. In the exemplary embodiment, as the game screen, a game image obtained by imaging the virtual game space by perspective projection by a first virtual camera is displayed. In FIG. 4, a player object 201, a sight 202, and a status bar 203 are displayed. This game image is an image when the game space is seen from the back of the player object 201. The player can move the player object 201 by operating the left analog stick 103L, for example. The player object 201 carries a gun that is capable of shooting ink, and can shoot ink in accordance with a shooting command (for example, operation of ZR button) from the player. The shot ink moves toward the position indicated by the sight 202 in the virtual game space. In this way, the player can expand the territory by applying ink to a ground surface or a wall in the virtual game space, and can attack by shooting ink at an enemy object.

Here, in this game, plural types of "weapons" are set, and the attacking method or the like when a shooting operation is performed can be switched by equipping the player object with any of the weapons. It is noted that these plural types of weapons are different in performances such as shooting range and continuous-firing performance.

In FIG. 4, the sight 202 is set at a position corresponding to almost the center of the screen, for example. In this game, the sight 202 is set at a position almost coinciding with the gaze point of the first virtual camera.

In this game, it is also possible to change the direction of the first virtual camera by player's operation. Specifically, the direction of the first virtual camera is controlled on the basis of the orientation of the game apparatus 101 calculated on the basis of output from the inertia sensor 117. In other words, in the virtual game space, the first virtual camera moves in conjunction with variation in the orientation of the game apparatus 101 in the real space. For example, if the player rotates the game apparatus 101 leftward around in the gravity-direction axis in the real space, the direction of the first virtual camera set in the game space is also controlled so as to face leftward. As described above, the position of the sight 202 almost coincides with the gaze point of the first virtual camera. Therefore, the sight 202 can be also controlled on the basis of the orientation of the game apparatus 101. Besides, it is also possible to change the direction of the first virtual camera on the basis of an operation to the right analog stick 103R.

In FIG. 4, the status bar 203 is displayed at an upper part on the screen. On the status bar 203, the remaining time of the competition is displayed at the center, player information about the team (own team) to which the player belongs is displayed at the right, and player information about the opponent team is displayed at the left. That is, images 204A to 204H indicating the respective players are arranged being separated to the left and right on the status bar 203. Each image 204 indicates an image of a weapon with which the corresponding player is currently equipped. In addition, each image 204 indicates, through change in the display manner thereof, whether the corresponding player is able to use a "special skill", and whether the corresponding player is unable to act. For example, if the image 204 is displayed so as to flash in iridescent color, this indicates that the corresponding player is able to use the "special skill" which can make a strong attack. If the image 204 is displayed being blacked out with a mark "x" superimposed thereon, this indicates that the player is currently unable to act (because the player is defeated by an enemy, for example).

Here, in this game, the player's names are also displayed above the ally objects and enemy objects so that each player can easily identify the other players. For example, if an ally object is defeated by an enemy and thus becomes unable to act, a mark "x" is displayed being superimposed also on the player's name displayed above the ally object, at the time when the ally object becomes unable to act. In this game, when a predetermined time has passed since the player object became unable to act, the player object is returned to a "start point" set in advance in the virtual game space and returns to be able to act.

(Map Screen)

In this game, various objects such as walls, buildings, and trees which obstruct the player's view are also placed in the virtual game space. Therefore, it is difficult for the player to know whether or not, for example, an opponent player object (enemy object) or an own-team player object (ally object) is present behind such an object, just by looking at the game image. Therefore, in this game, by pressing a predetermined operation button 104, the player can cause the display section 116 to display a map image showing a wide range of the virtual game space.

Figure 5:
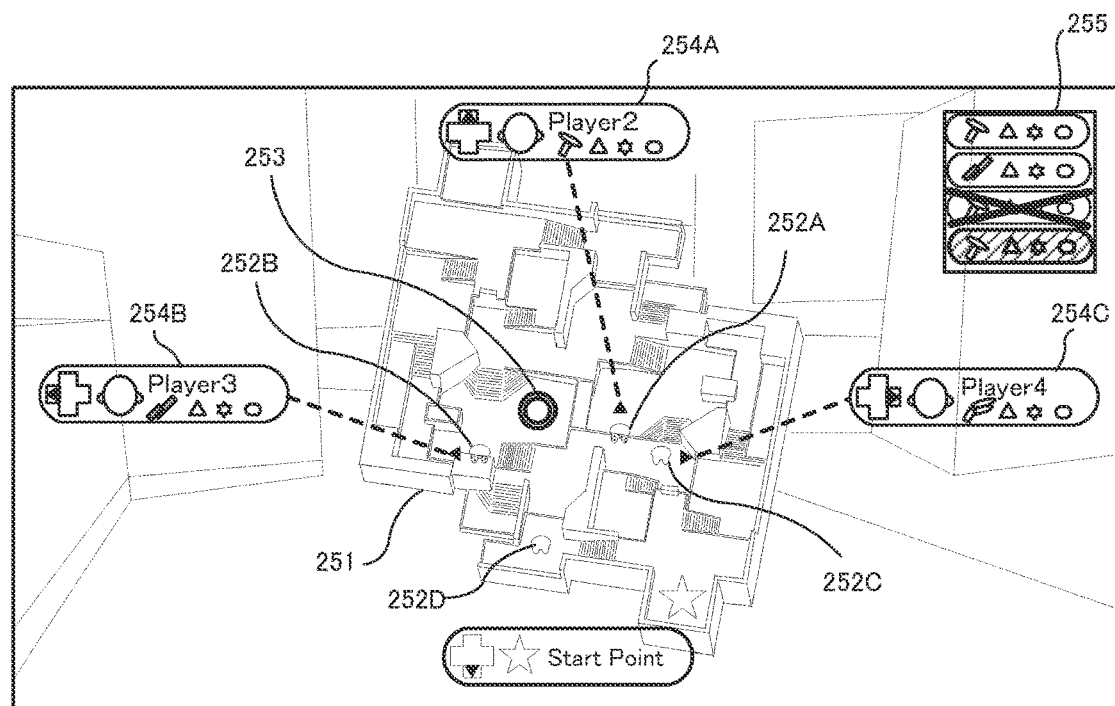
FIG. 5 shows a non-limiting example of a map image according to the exemplary embodiment.

FIG. 5 shows an example of the map image (screen on which the map image is displayed). In a state in which a normal game image is displayed, if the player presses a predetermined operation button (hereinafter, referred to as a map button) assigned for map display, the map image is displayed at the center of the screen so as to be superimposed on the game image. In addition, an image obtained by blurring the game image is displayed behind the map image (in FIG. 5, the game image indicated by a dotted line is the blurred image).

In FIG. 5, a map object 251, player icons 252A to 252D, a cursor 253, ally status images 254A to 254C, and an enemy status image 255 are displayed on the map image. It is noted that, although not shown, the enemy objects are displayed by player icons in a different color on the map image. For example, the ally team is indicated by blue player icons, and the enemy team is indicated by red player icons.

The map object 251 is an object of a three-dimensional model corresponding to the virtual game space. In this game, the map object 251 is placed in a second three-dimensional virtual space (hereinafter, may be referred to as a map space) different from the virtual game space (first three-dimensional virtual space). An image obtained by imaging the map object 251 from above by a second virtual camera is displayed as the map image.

Here, in this game, the direction of the second virtual camera for imaging the map object 251 is set such that, instead of setting the second virtual camera in a straightly downward direction, in principle, the second virtual camera is inclined by a slight angle so as to obtain an image seen from a slightly oblique direction (the gaze point of the second virtual camera is the center of the map object). In this game, the virtual game space (game field) has difference of elevation, and if imaging is performed from a perfect overhead perspective, the resultant image is displayed like a two-dimensional image, so that it becomes difficult to grasp height-direction information from the map image. That is, in this game, the following map image is displayed by default: the entire map object is displayed so as to become close to an overhead-view map as much as possible, thereby making it easy to grasp the map structure (that is, keeping the format as a "map image"), while the map object is imaged from a slightly oblique direction so that the player can grasp the elevation relationship in the virtual game space. For example, as shown in FIG. 6, imaging is performed with the second virtual camera inclined by an angle of about 10 degrees with respect to the state in which the imaging direction is a straightly downward direction.

In this game, the map object 251 is imaged by orthogonal projection. The reason therefor is as follows. As described above, this game has characteristics that the players compete on areas painted with inks. The map image allows each player to easily grasp the power balance (e.g., ratio of areas painted with their respective inks) between the own team and the enemy team. Here, if an image obtained by imaging the map object 251 by perspective projection is presented to the player, there is a possibility that, even if the areas of the painted regions on the near side and the far side of the virtual camera are the same, these areas appear to be different because the imaging is performed from a slightly oblique direction as described above. Therefore, the image obtained by orthogonal projection is presented to the player, thereby allowing the player to grasp the power balance condition (areas painted with inks) more accurately.

Figure 7:
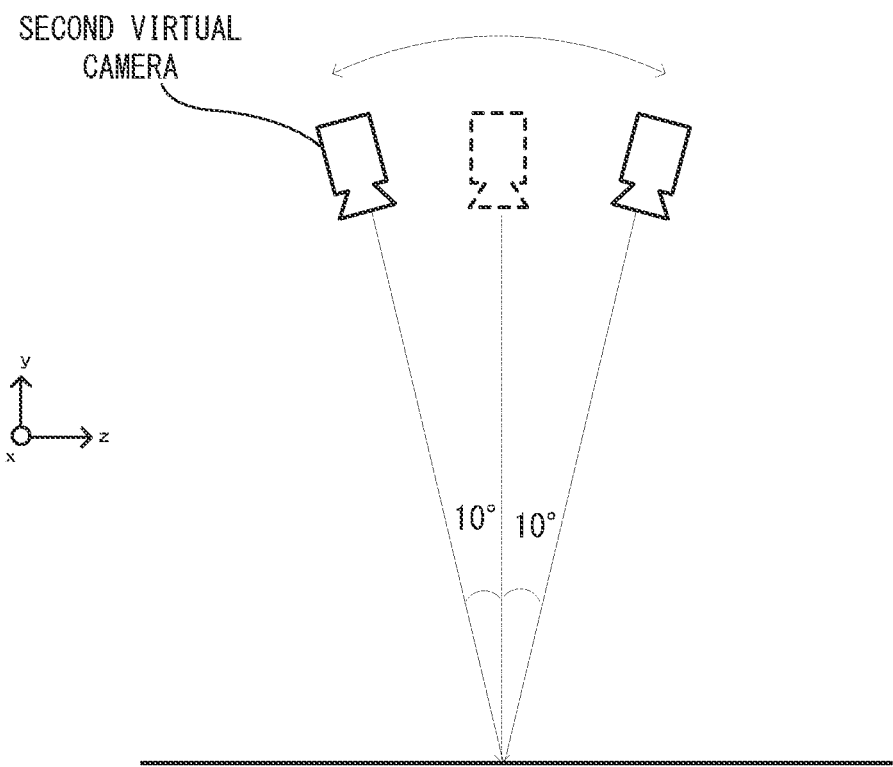
FIG. 7 is a diagram for explaining a non-limiting example of the second virtual camera.
Figure 8:
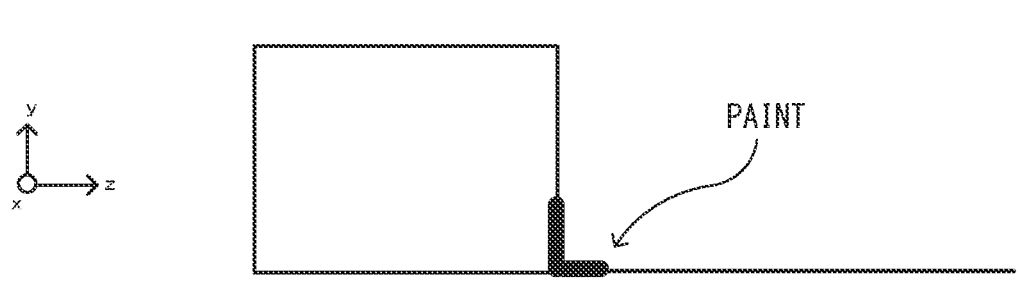
FIG. 8 is a diagram for explaining a non-limiting example of the second virtual camera.
Figure 9:
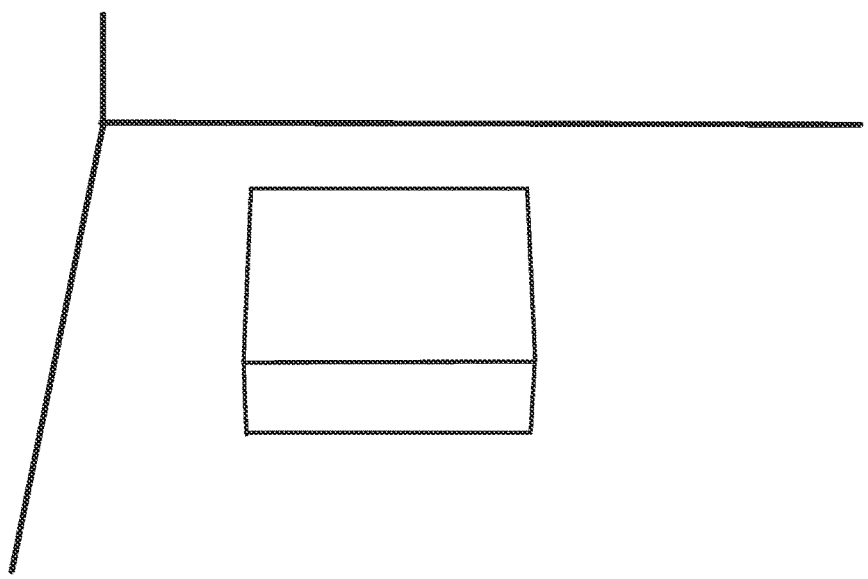
FIG. 9 is a diagram for explaining a non-limiting example of the second virtual camera.
Figure 10:
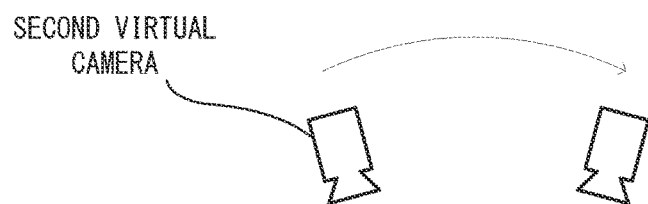
FIG. 10 is a diagram for explaining a non-limiting example of the second virtual camera.
Figure 10:
Figure 11:
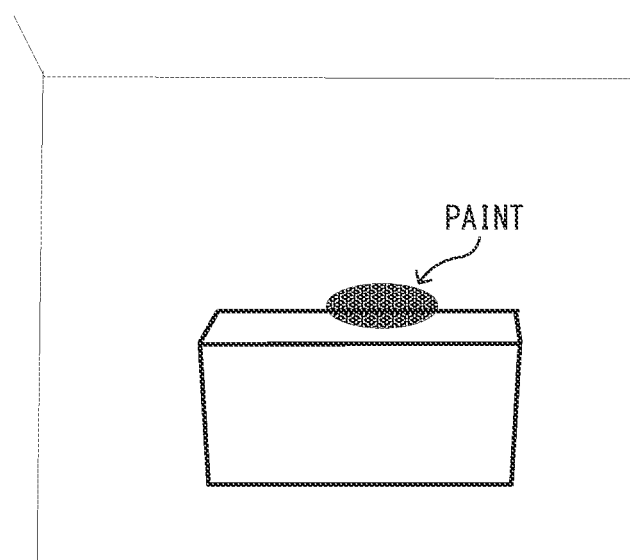
FIG. 11 is a diagram for explaining a non-limiting example of the second virtual camera.

In this game, the position and the direction of the second virtual camera can be controlled to a certain extent by the player. Specifically, these can be controlled on the basis of the orientation of the game apparatus 101 calculated on the basis of output from the inertia sensor 117 as described above. By changing the orientation of the game apparatus 101, the player can control the position and the direction of the second virtual camera, as well as controlling the first virtual camera. However, the controllable range of the second virtual camera is limited. In this game, as shown in FIG. 7, it is possible to control the position and the direction of the second virtual camera only within an angle range of ±10 degrees with respect to a state in which the imaging direction is a straightly downward direction. This is provided for the purpose of reducing a negative effect due to the feature of performing imaging from a slightly oblique direction as described above while ensuring a function as a "map image" which allows the entire structure (except for height) to be easily grasped. For example, as shown in FIG. 8, it is assumed that, at a stepped place, a part of a wall and a part of a ground surface are painted with ink. In this case, the map image is displayed as shown in FIG. 9, for example. From this image, it is impossible to grasp the state of a part that is behind and immediately below the step. In such a case, the player turns the orientation of the game apparatus 101 so that the upper part thereof slightly approaches the near side, for example. That is, the player changes the orientation so as to peek into the side behind the step. In accordance with this operation, the position and the direction of the second virtual camera are changed as shown in FIG. 10, for example. As a result, as shown in FIG. 11, it becomes possible to see the side behind the step, and thus such a map image as to allow the player to recognize that ink is applied there, is presented to the player.

Figure 6:
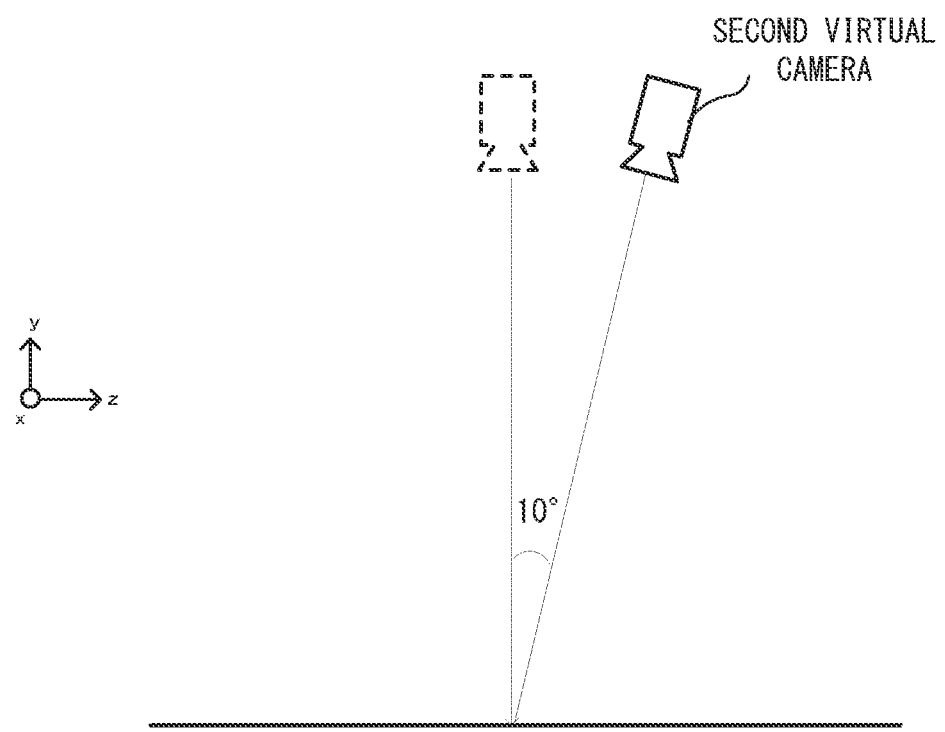
FIG. 6 is a diagram for explaining a non-limiting example of a second virtual camera.

In another embodiment, the controllable range of the second virtual camera may be set to a range of, for example, 0 to 10 degrees (range as shown in FIG. 6). The map image is an oblique-view image by default. Therefore, by setting the position of 0 degrees as an end of the controllable range, it is possible to enhance operability when the player wants to view the map in an overhead manner. That is, if the controllable range is set to a range of −10 to +10 degrees, it is difficult to adjust the position exactly at 0 degrees (position at which an overhead view is obtained) by quick operation. Accordingly, by setting the position of 0 degrees as an end of the controllable range, it becomes possible to quickly move the second virtual camera to a position at which an overhead view is obtained.

In this game, even while the map image is displayed being superimposed on the game image, the player can move the player object 201 or can cause the player object 201 to perform a shooting action. That is, the player can operate the player object 201 in the same manner as when a normal game image is displayed. In other words, the first virtual camera and the second virtual camera are simultaneously controlled when an input for virtual camera operation is given from the player (in a state in which the map image is displayed). Motions of the first virtual camera and the second virtual camera are in conjunction with each other, but as for change in the movement and angle of each virtual camera, different controls are performed on the respective virtual cameras. In the exemplary embodiment, since a limit is provided on the controllable range of the second virtual camera as described above, the movable range of the first virtual camera becomes greater than the movable range of the second virtual camera even under the same operation.

Next, other elements displayed on the map image will be described. The player icons 252A to 252D are images serving as indicators for indicating the positions of the player object 201 and the ally objects. In FIG. 5, the player icon 252D indicates the player object 201, and the player icons 252A to 252C respectively indicate the ally objects. In addition, the ally status images 254A to 254C are also displayed on the map image. Although these ally status images 254 will be described later, they are displayed so as to allow the player to recognize that the player icons 252A to 252C are associated with the ally status images 254A to 254C. In the example shown in FIG. 5, the player icons 252A to 252C and the ally status images 254A to 254C are displayed so as to be connected by dotted lines, respectively. It is noted that, in the exemplary embodiment, the display manners of the player icons 252 also have some features, which will be described later.

Next, the cursor 253 displayed on the map image will be described. The cursor 253 is used for designating a predetermined position on the map image. The designating position (displayed position) of the cursor 253 can be controlled on the basis of the orientation of the game apparatus 101. That is, in a state in which the map image is displayed, by changing the orientation of the game apparatus 101, the player can also change the designating position of the cursor 253, as well as controlling the first and second virtual cameras. For example, if the player wants to move the cursor 253 upward, the player can slightly move the cursor 253 upward by turning the orientation of the game apparatus 101 so that the upper part thereof slightly approaches the near side, for example. Through such an operation, the player can also set (designate) the cursor 253 at one of the player icons 252, for example.

In the exemplary embodiment, it is possible to cause the player object 201 to perform an action called "super jump". This action can be executed by the player pressing a predetermined operation button (hereinafter, SJ button) assigned for super jump, when the position of one of the player icons 252 is designated by the cursor 253 on the map image. In other words, if the SJ button is pressed in a state in which one of the ally objects is designated, the player object 201 can be caused to execute a super jump. By performing this action (operation), it is possible to cause the player object 201 to jump so as to land at a position, in the virtual game space, that corresponds to the position (position of one of the player icons 252) designated by the cursor 253 on the map object. The trajectory of this jump movement is such a high jump trajectory as to jump over various obstacles in the virtual game space. Thus, it is possible to move the player object 201 to a position where one of the ally objects is present, at high speed (or almost momentarily).

Regarding designation of an ally object, in this game, it is also possible to designate an ally object by using the left operation button 104L, as well as by changing the designating position of the cursor 253 on the basis of change in the orientation of the game apparatus 101. For example, in this game, of the left operation buttons 104L, the button (hereinafter, upper button) located on the upper side is associated with the first ally object (in FIG. 5, Player 2), the button (hereinafter, left button) located at the left is associated with the second ally object (in FIG. 5, Player 3), and the button (hereinafter, right button) located at the right is associated with the third ally object (in FIG. 5, Player 4). It is noted that the button (hereinafter, lower button) located on the lower side is associated with the start point in the game. If the player presses, for example, the upper button, the cursor 253 immediately moves to the player icon 252A corresponding to the first ally object. Then, if the player continues pressing the upper button, the cursor 253 continues being displayed at the position of the player icon 252A irrespective of the orientation of the game apparatus 101. Therefore, for example, if the player wants to perform a super jump to the position of the ally object corresponding to the player icon 252A, the player would press the SJ button while pressing the upper button. Thus, it is also possible to perform an operation for designating a player icon by using the left operation buttons 104L (as substitute for cross key), whereby convenience of player's operation is improved.

Figure 12:
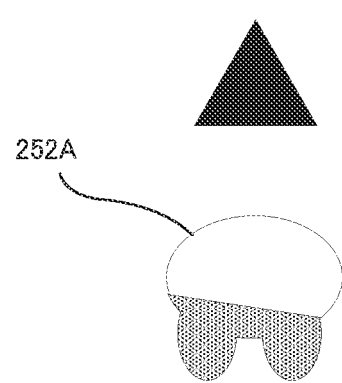
FIG. 12 is an enlarged view of a non-limiting example of a player icon 252A.

Here, in order to present the directions of the left operation buttons 104L assigned to the respective player icons 252 to the player in an easily understandable manner, in this game, marks indicating the directions of the left operation buttons 104L are also displayed around the player icons 252. FIG. 12 shows an enlarged view of the player icon 252A shown in FIG. 5. The upper button is assigned to the player icon 252A. Therefore, an upward triangle mark is displayed on the upper side of the player icon 252A. Although not shown, for the player icon 252B, a leftward triangle mark is displayed at the left thereof in order to indicate that the left button is assigned thereto. For the player icon 252C, a rightward triangle mark is displayed at the right thereof in order to indicate that the right button is assigned thereto.

In this game, it is also possible to designate a location other than the ally objects (and start point) as the landing destination of a super jump. Specifically, it is also possible to cause the player object 201 to place a landing point object which can be designated as a "landing point", at any position in the virtual game space. Although no left operation button 104L is assigned to such a landing point object, it is possible to perform super jump movement in accordance with designation by the cursor 253.

Next, the ally status images 254 will be described. As described above, on the map image, the status images 254A to 254C are displayed in such a manner that the player can understand that these images are associated with the respective player icons 252. Here, as for their display positions, the ally status image 254A is displayed at the upper part of the screen, the ally status image 254B is displayed at the left part of the screen, and the ally status image 254C is displayed at the right part of the screen. In this game, these display positions of the ally status images 254 are fixed positions. As described above, the player icons 252 of the ally objects are assigned with the buttons in the respective directions, of the left operation buttons 104L, and therefore, in order that the player can intuitively grasp the assigned directions, the ally status images 254 are arranged at positions corresponding to the assigned directions. Thus, when the player is to determine a landing destination of the super jump, the player can be provided with two types of selection bases: selection of a super jump destination based on "ally object"; and selection of a super jump destination based on "landing position". For example, there are a case where the player "wants to move to Player 2" and a case where the player "wants to move to a specified position on the map". In the former selection basis, rather than where the landing position is, to whom the player wants to move is regarded as important. In the latter selection basis, where on the map the player wants to move is regarded as important, without concern about who is the player. In this way, a plurality of selection bases are provided to enhance the game strategy.

Next, elements displayed on each ally status image 254 will be described. Each ally status image 254 shown in FIG. 5 includes, from the left, a cross image, a face image, a player name, and a group of icons. The cross image indicates, of the left operation buttons 104L, the button assigned to the corresponding player icon as described above. The face image indicates the face of the corresponding ally object. As the group of icons, for example, an image indicating a weapon with which the corresponding ally object is equipped, an image indicating an available skill, and an image indicating the state of the ally object (e.g., attack power being increased) are displayed. The player can also grasp the state of each ally object in detail to a certain extent, by referring to the ally status image 254.

Next, the enemy status image 255 displayed at the upper right of the map image will be described. The enemy status image 255 indicates a list of the statuses of the enemy objects of the opponent team.

Here, in this game, the player object and the ally and enemy objects each can perform a "special attack" which is stronger than a normal attack, if a predetermined condition is satisfied. The special attack becomes "executable" if a predetermined condition is satisfied. Thereafter, the "special attack" can be executed by each player performing a predetermined operation. In this game, the display manner of the ally status image 254 or the enemy status image 255 is changed for the player object or the ally/enemy object that has come into the "executable" state. This allows the player to intuitively recognize that the "special attack" is executable. As the display manner therefor, the background part thereof may be flashed in iridescent color, for example. In the example shown in FIG. 5, the display manner of the background image at the lowermost part of the enemy status image 255 is changed to indicate that the corresponding enemy object can execute a "special attack".

Figure 13:
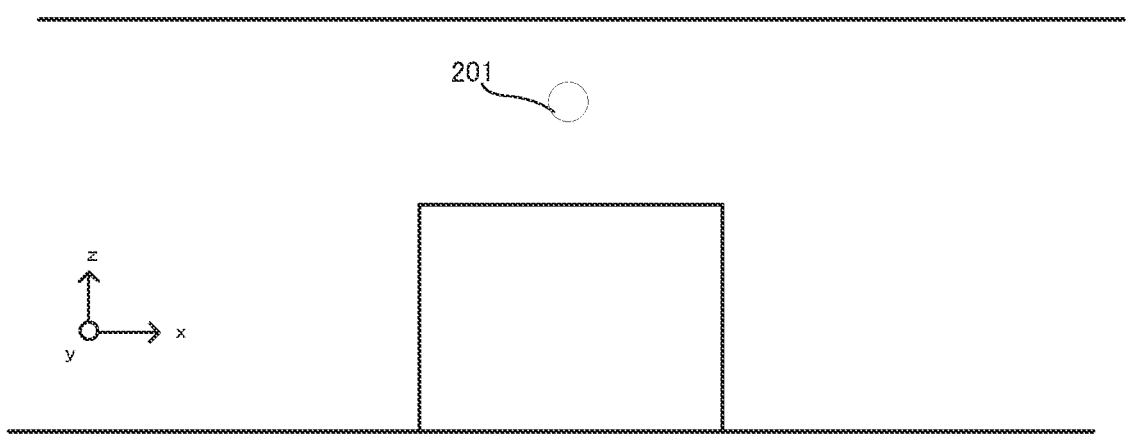
FIG. 13 is a diagram for explaining a non-limiting example of the size of a player icon.
Figure 14:
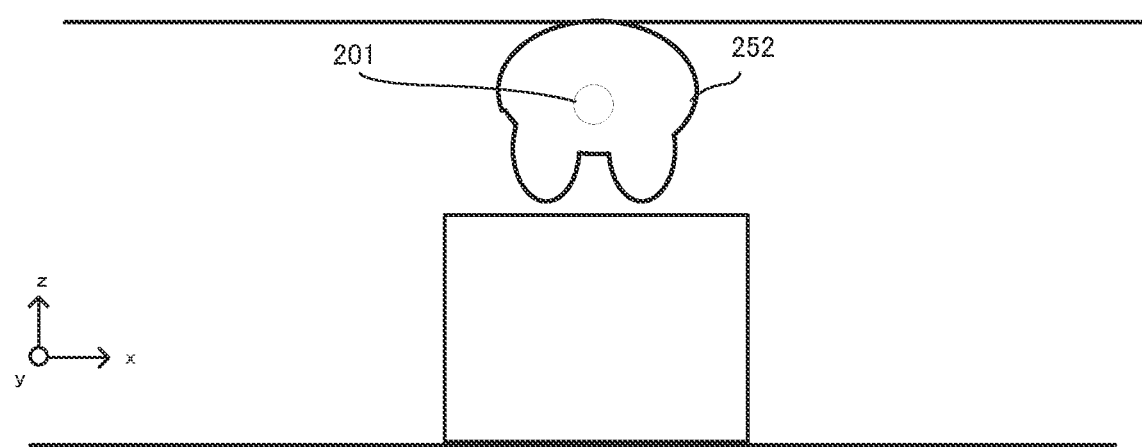
FIG. 14 is a diagram for explaining a non-limiting example of the size of the player icon.

Next, the display manner and the like of the player icon 252 will be further described. First, as a premise, the size of the player icon 252 will be described. In this game, the size of the player icon 252 displayed on the map screen does not coincide with the size of the player object 201 in the virtual game space, and the player icon 252 has a relatively larger size. That is, the area occupied by the player icon 252 on the map screen is larger than the area actually occupied by the corresponding player object 201 (also ally objects; hereinafter, expression "player object 201" may include ally objects") in the virtual game space. As described above, the map image is displayed so as to indicate a wide range (e.g., entire image) (in other words, displayed on a reduced scale), and this is for presenting, to the player, the player icons with their sizes made larger than those of the actual player objects, so as to facilitate player's visual recognition. For example, it is assumed that the player object 201 is present at a predetermined position with a size shown in FIG. 13 when the virtual game space is viewed in an overhead manner. Then, if the player icon 252 displayed on the map screen were placed on the virtual game space, the player icon 252 would become such a size as to occupy a larger area than the actual player object 201, as shown in FIG. 14.

It is noted that, in this game, when the player icon 252 is placed on the map object, the center position of the player icon 252 is located so as to coincide with the position at which the corresponding player object is present.

In this game, the player icon 252 is a planar object (plate-like polygon) with no thickness. Using planar objects with no thickness as described above makes it unnecessary to perform a hidden surface process for the back side of the object, thereby reducing a processing load. In another embodiment, the player icon may be a three-dimensional object.

In this game, the map object 251 is displayed as a three-dimensional model. That is, the map object 251 has also height information, unlike a two-dimensional map (overhead-view map). Meanwhile, the player icon 252 has a larger size than that of the actual player object. Therefore, in the following situations, it might be difficult for the player to grasp the position in the height direction of the player object 201 from the map image.

Figure 15:
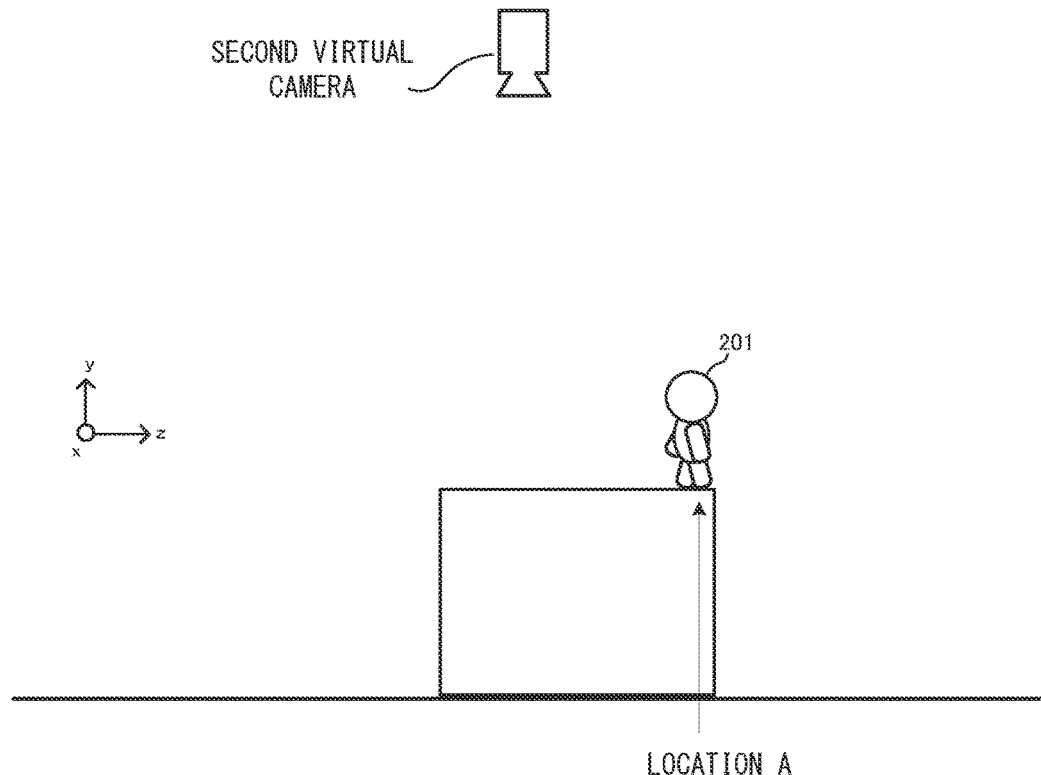
FIG. 15 is a diagram for explaining a non-limiting example of the display manner of the player icon.
Figure 16:
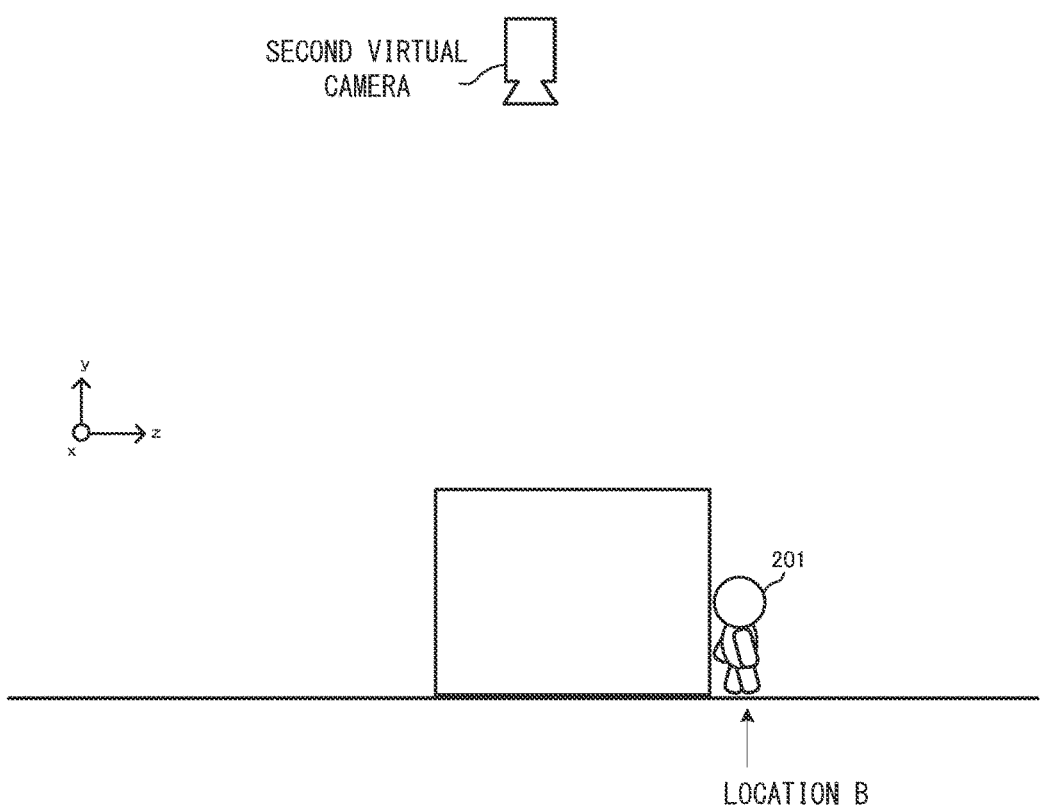
FIG. 16 is a diagram for explaining a non-limiting example of the display manner of the player icon.

First, it is assumed that the player object 201 is located near the border of a step. FIG. 15 and FIG. 16 show examples of such a situation. FIG. 15 shows the case where the player object 201 is at the border of the step and on the upper side of the step (position A), and FIG. 16 shows the case where the player object 201 is on the lower side of the step (position B) (here, the positions of the player objects 201 on the x axis in both cases are the same). Under such a situation, in the map image, the player icon 252 is displayed at almost the same position in both cases (because the scale of the map image is small). In addition, the display area occupied by the player icon 252 is to stride the border of the step. Therefore, although the player can recognize the presence of the player object 201 near the step, it might be difficult to recognize whether the player object 201 is present on the upper side or the lower side of the step.

Figure 17:
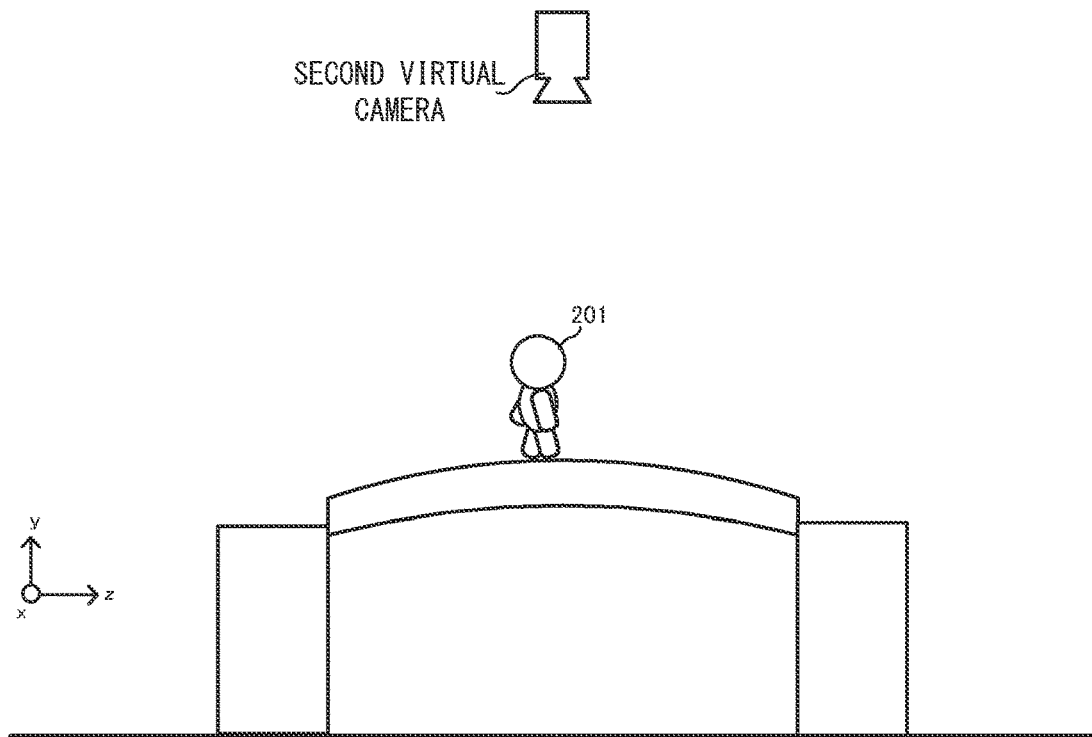
FIG. 17 is a diagram for explaining a non-limiting example of the display manner of the player icon.
Figure 18:
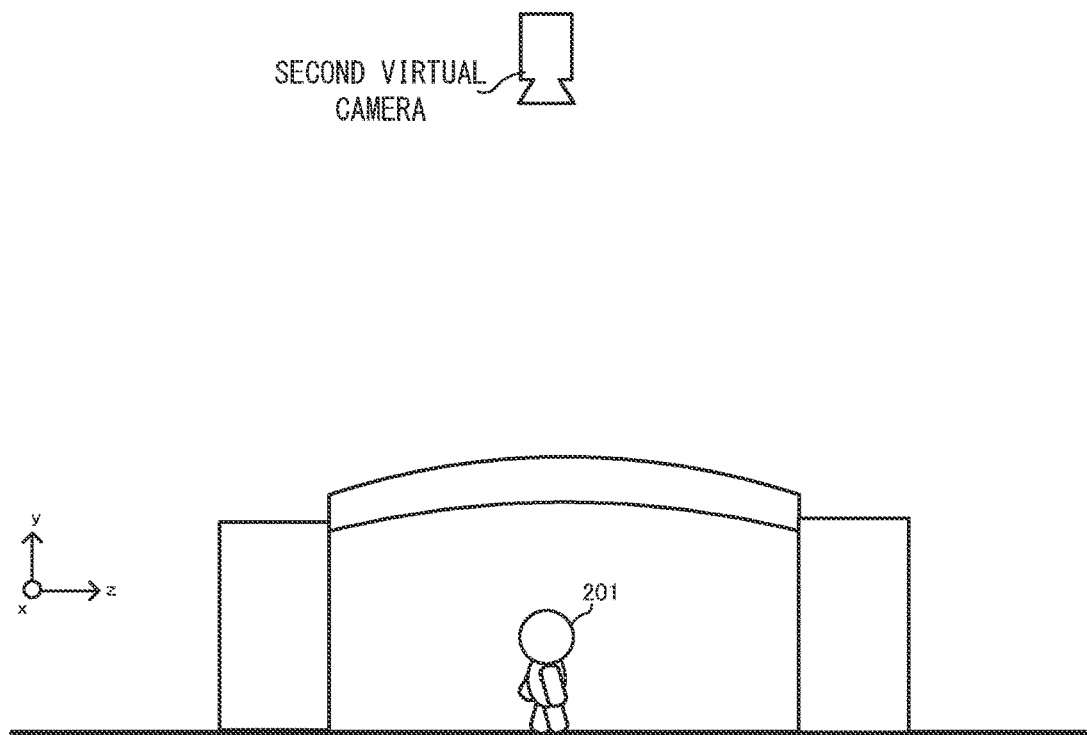
FIG. 18 is a diagram for explaining a non-limiting example of the display manner of the player icon.

As another situation example, it is assumed that the player object 201 is located on or under a "bridge". FIG. 17 and FIG. 18 show examples of such a situation. FIG. 17 shows the case where the player object 201 is located on the bridge, and FIG. 18 shows the case where the player object 201 is located under the bridge (here, the positions of the player objects 201 on the x axis and the y axis in both cases are the same). In such a situation, depending on the angle of the virtual camera, the player icon 252 might appear to be at the same position on the map image. Therefore, it might be difficult for the player to recognize whether the player object 201 is placed on the bridge or under the bridge.

Figure 19:
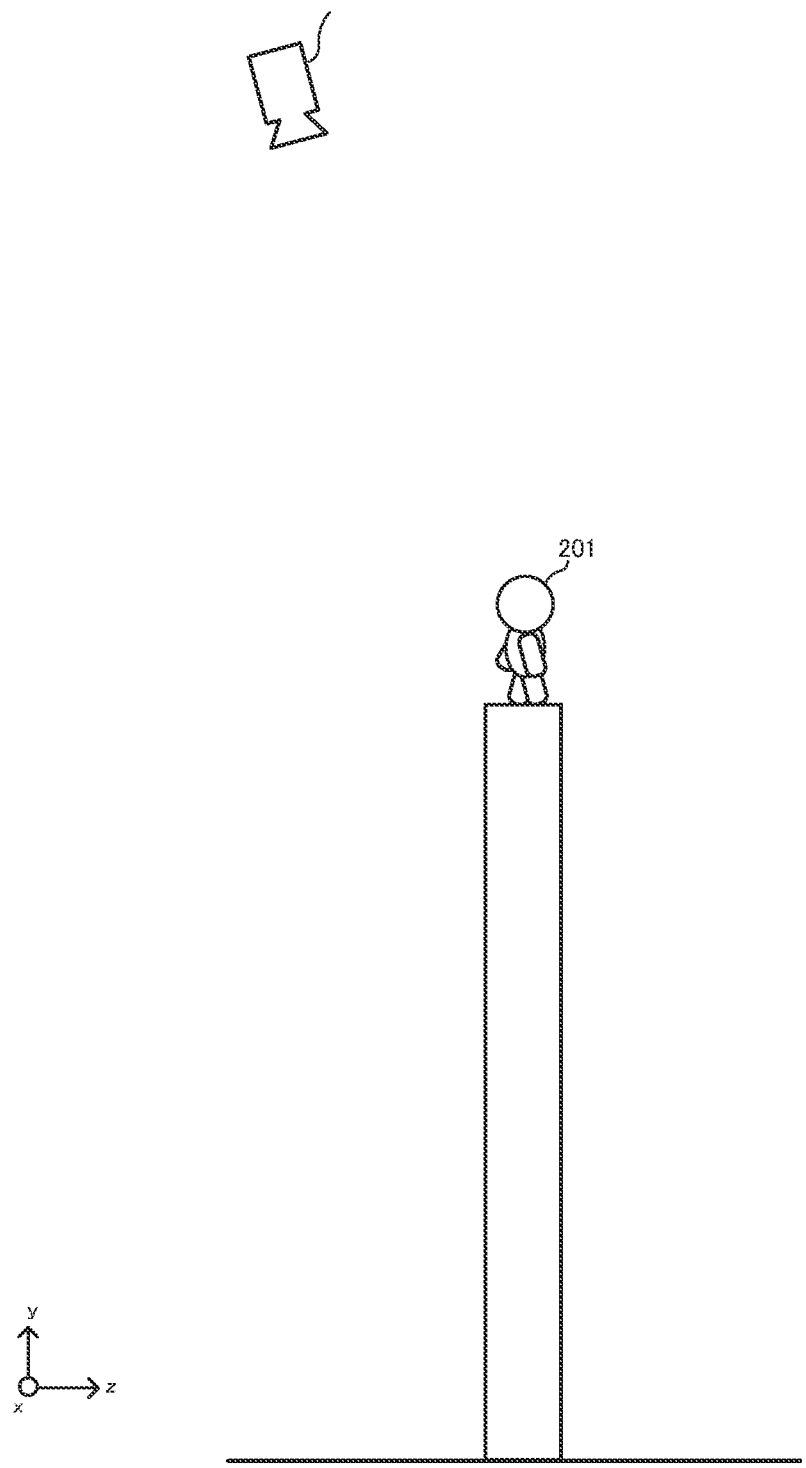
FIG. 19 is a diagram for explaining a non-limiting example of the display manner of the player icon.
Figure 20:
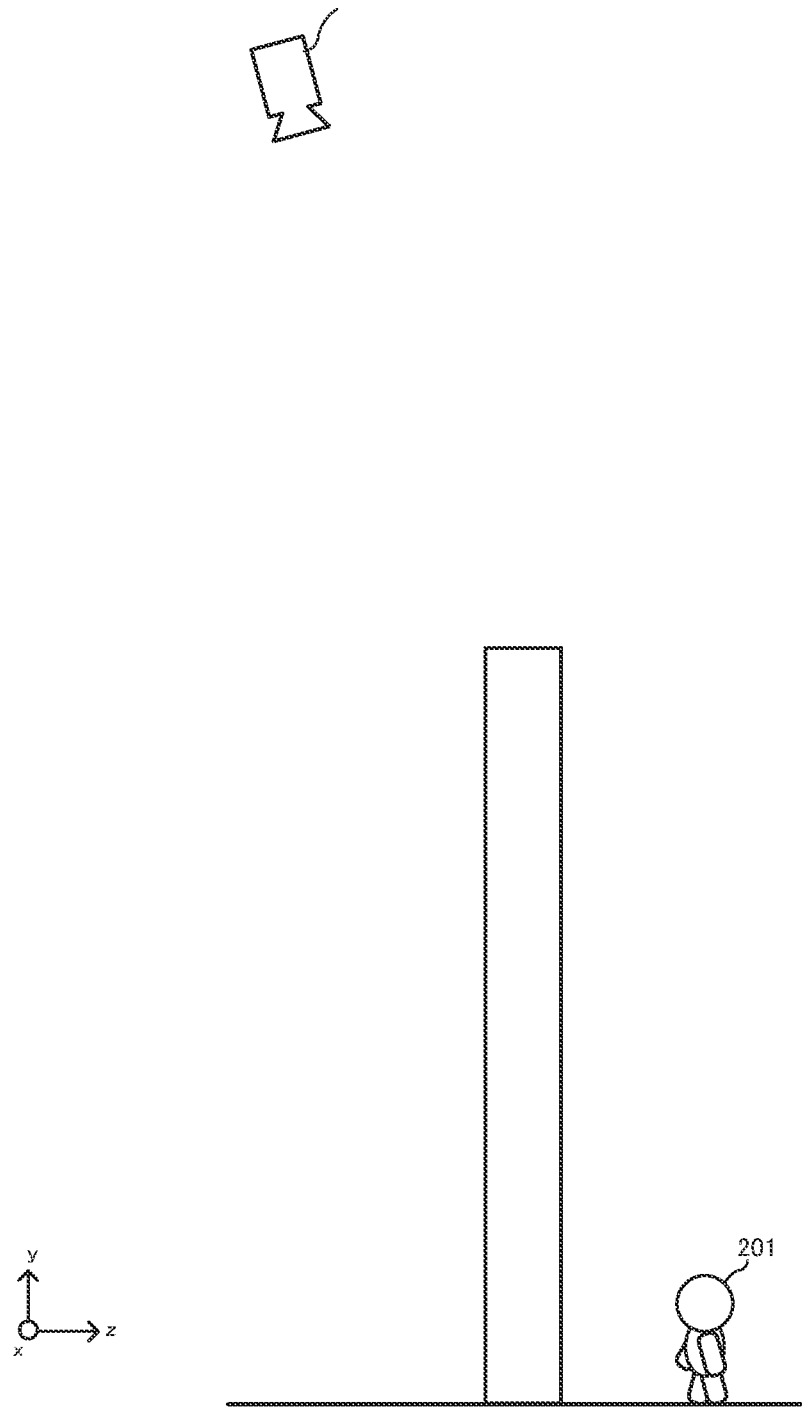
FIG. 20 is a diagram for explaining a non-limiting example of the display manner of the player icon.

As still another situation example, the case where the player object 201 is on a building object or the like having a height as shown in FIG. 19, and the case where the player object 201 is on the ground surface as shown in FIG. 20, are assumed (the positions of the player objects 201 on the x axis in both cases are the same). Also in such a situation, depending on the angle of the virtual camera, the player icon 252 might appear to be at the same position on the map image. Therefore, it is difficult for the player to recognize whether the player object 201 is on the rooftop of the building object or on the ground surface side.

Here, as described above, in this game, it is possible to cause the player object 201 to directly move to the position of the ally object by using a "super jump". Because of the nature of competition game, where to land by the "super jump" is an important factor for game strategy and determination of a winner and a loser in the game. For example, in a situation where there is a step as shown in FIG. 15 and FIG. 16, if a super jump is performed, the landing point varies depending on whether the ally object is on the upper side or the lower side of the step. For example, in the case where there is an enemy object on the lower side of the step, the player object will be safe if the player object lands on the upper side of the step, but the player object will fall into a dangerous situation if the player object lands on the lower side of the step. Therefore, it is considered that, even in the map image, it is highly necessary to grasp the position in the height direction of the ally object (or player object 201). However, as described above, it becomes difficult to grasp height-direction information if a map image obtained by merely placing the player icon 252 on the map object and imaging them by the second virtual camera is presented.

Considering the above, in this game, the following process is performed for the display manner of the player icon 252, thereby allowing the player to easily grasp more accurate information (positional relationship in height direction) from the map image. Specifically, in this game, a process is performed to change the display manner of a part hidden by an obstacle such as a wall when the player icon 252 placed on the map object is viewed from the second virtual camera, thereby making it easy to grasp the positional relationship in the height direction of the player object corresponding to the player icon 252. This will be described below with reference to the drawings.

Figure 21:
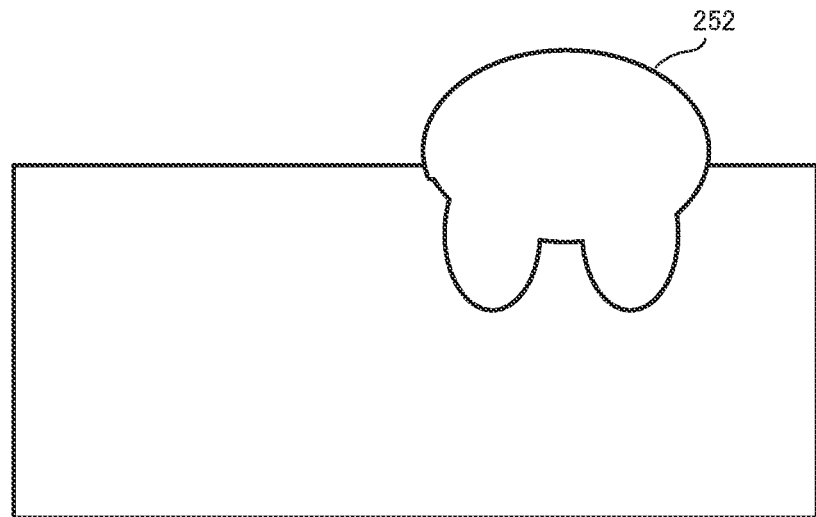
FIG. 21 is a diagram for explaining a non-limiting example of the display manner of the player icon.
Figure 22:
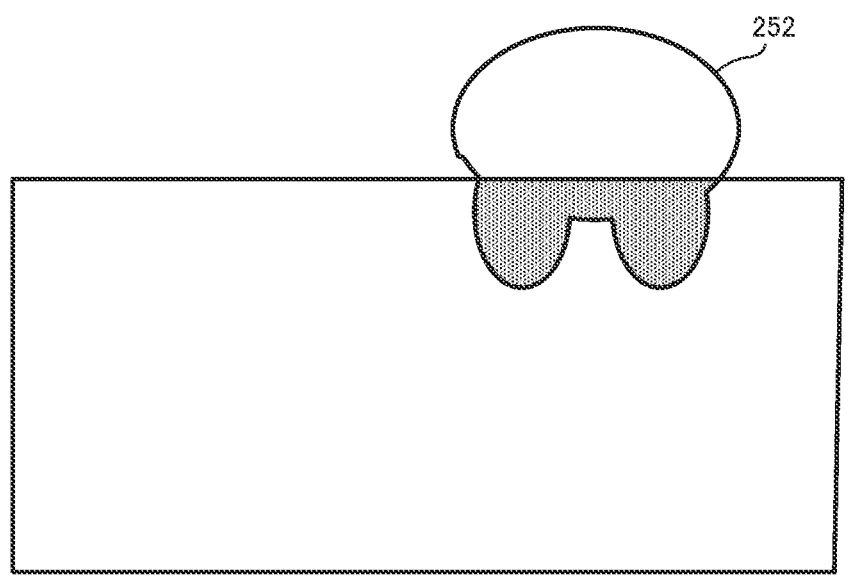
FIG. 22 is a diagram for explaining a non-limiting example of the display manner of the player icon.

FIG. 21 and FIG. 22 show examples of the map image in this game, respectively corresponding to the situations shown in FIG. 15 and FIG. 16 described above. It is noted that, in these drawings, only the player icon 252 part is enlarged for the purpose of facilitating the understanding. First, FIG. 21 shows the display manner of the player icon 252 in the case where the player object 201 is located on the upper side of the step (case of FIG. 15). On the other hand, FIG. 22 shows the display manner of the player icon 252 in the case where the player object 201 is located on the lower side of the step (case of FIG. 16). In FIG. 21, the player icon 252 is placed on the upper side of the step, and when the player object 201 is viewed from the second virtual camera, the entire body thereof is visible. Therefore, the entire player icon 252 is displayed in a normal display manner. On the other hand, in FIG. 22, the player icon 252 is located on the lower side of the step (ground surface part), and substantially the lower half of the player icon 252 is hidden by the step (the lower half appears to sink into the step), so that the lower half is invisible from the second virtual camera. In this game, in such a case, the part of the player icon 252 that is invisible from the second virtual camera is displayed with the display manner thereof changed so that only this part is displayed as a silhouette, for example. Specifically, in this game, hidden surface determination (for which any algorithm may be used, for example, Z-buffer method may be used) is performed for the player icon 252, thereby determining what part is hidden and invisible from the second virtual camera (viewpoint thereof). Then, for the part invisible from the second virtual camera, an image of the player icon 252 is generated with the display manner of that part changed (as a result, at the part invisible from the second virtual camera, the obstacle appears transparent). In other words, for the part that would be removed by a so-called hidden surface removing process, a process is performed so as to perform drawing with the display manner thereof changed, instead of removing that part.

Figure 23:
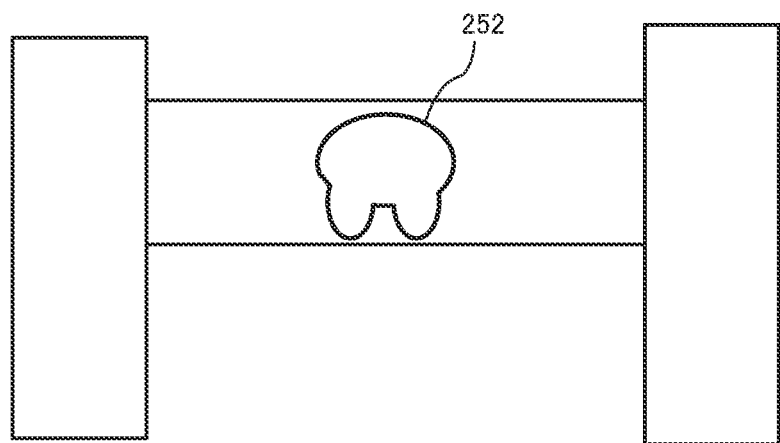
FIG. 23 is a diagram for explaining a non-limiting example of the display manner of the player icon.
Figure 24:
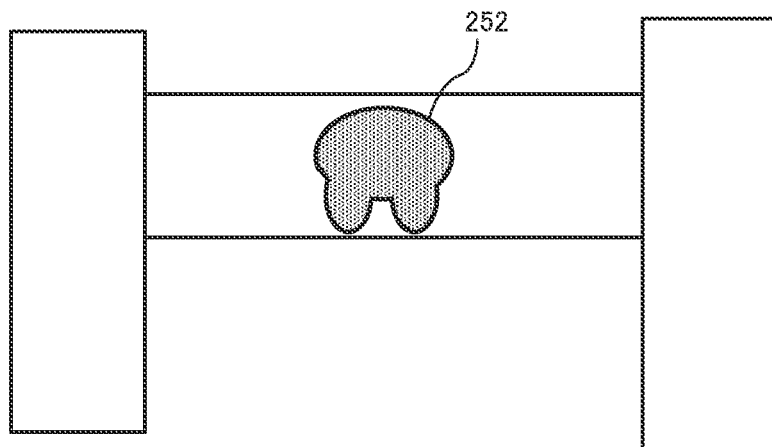
FIG. 24 is a diagram for explaining a non-limiting example of the display manner of the player icon.

As another example, FIG. 23 and FIG. 24 show examples of the map image (player icon 252), respectively corresponding to the situations shown in FIG. 17 and FIG. 18 described above. FIG. 23 shows the display manner of the player icon 252 in the case where the player object 201 is located on the bridge (case of FIG. 17). FIG. 24 shows the display manner of the player icon 252 in the case where the player object 201 is located under the bridge (case of FIG. 18). In FIG. 24, as seen from the second virtual camera, the entire player icon 252 is hidden under the bridge and thus is invisible. Therefore, in FIG. 24, the display manner of the entire player icon 252 is changed, as compared to the case of FIG. 23.

Figure 25:
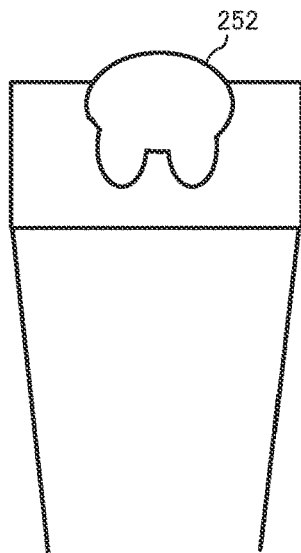
FIG. 25 is a diagram for explaining a non-limiting example of the display manner of the player icon.
Figure 26:
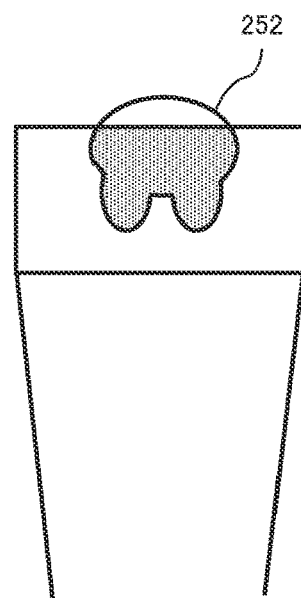
FIG. 26 is a diagram for explaining a non-limiting example of the display manner of the player icon.

As still another example, FIG. 25 and FIG. 26 show examples of the map image (player icon 252), respectively corresponding to the situations shown in FIG. 19 and FIG. 20 described above. FIG. 25 shows the display manner of the player icon 252 in the case where the player object 201 is located on the rooftop of the building object (case of FIG. 19). FIG. 26 shows the display manner of the player icon 252 in the case where the player object 201 is located on the ground surface (case of FIG. 20). In FIG. 25, the player icon 252 is placed on the rooftop, and therefore the entire player icon 252 is visible from the second virtual camera. In FIG. 26, the player icon 252 is placed on the ground surface, and as seen from the second virtual camera, a part thereof is hidden by the building object and thus is invisible. Therefore, an image of the player icon 252 is also displayed with the display manner changed for the part that is invisible by being hidden by the building object. In the case of such a high object, it is considered that, as seen from the second virtual camera, the area of the ground surface that is invisible by being hidden by that object increases. In this regard, by performing a process as in this game, it becomes easy to grasp the positional relationship in the height direction between such an object and the player icon 252 (player object).

As described above, in this game, a player icon is placed on the map object, and if there is a part that is invisible by being hidden by a constituent part or the like of the map object as seen from the second virtual camera, a player icon image is provided with the display manner of that part changed. Thus, it becomes possible to provide a map image that allows the player to more accurately grasp the positional relationship of the player object and the situation in the virtual game space.

Next, display in the map image other than the player icons will be described. As described above, the map object is a three-dimensional model, and has a height (difference of elevation). In this game, the surface part of the map object is displayed with its color changed in accordance with the height on the map object. Specifically, a parameter corresponding to at least one of hue, brightness, and saturation of that color is changed in accordance with the height. For example, even in the case of having the same color, a part at a higher location is displayed in a brighter color than a part at a lower location (brightness adjustment).

Figure 27:
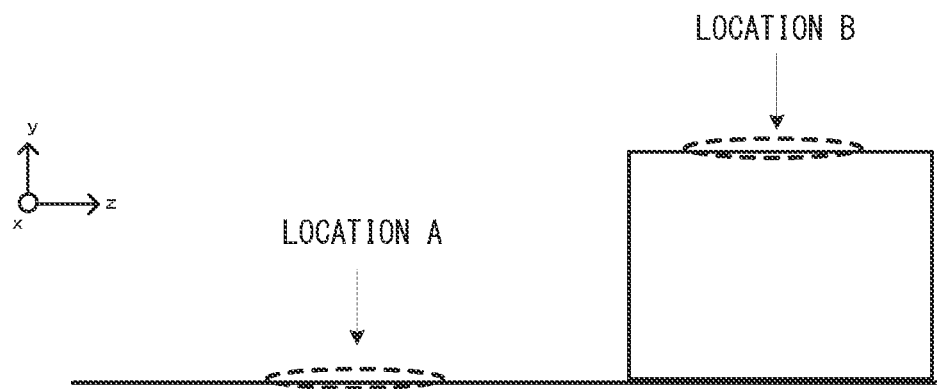
FIG. 27 is a diagram for explaining a non-limiting example of the display color of a map object.
Figure 28:
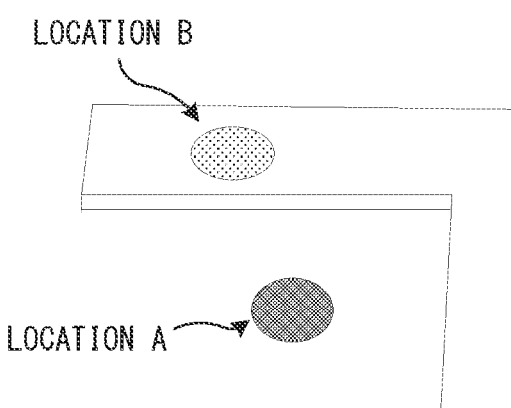
FIG. 28 is a diagram for explaining a non-limiting example of the display color of the map object.

In this game, as described above, the players compete on areas painted with ink in the virtual game space. For example, it is assumed that the color of ink of the own team is blue and the color of ink of the enemy team is red. Then, as shown in FIG. 27, it is assumed that the player object 201 applies blue ink to ground surface parts at a predetermined location A and a location B higher than the location A in the virtual game space. In this case, the map image is displayed as shown in FIG. 28. That is, even though the same blue ink is used, the blue at the location B is displayed brighter than the blue at the location A (it is noted that such display is for the map image, while in a normal game image, such a color changing process according to height is not performed). In addition, besides the colors of inks, similarly, the color of a ground surface part that is not painted with ink on the map object is also displayed with the aforementioned parameters thereof changed in accordance with the height. By performing such a process as well, it becomes possible to provide a map image that allows the player to easily grasp information about height.

Figure 29:
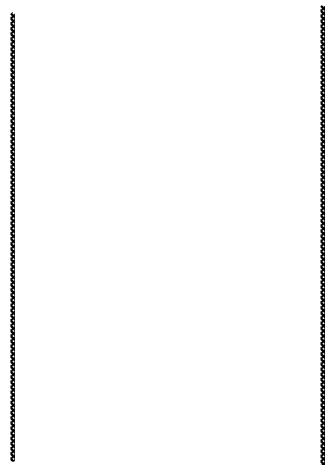
FIG. 29 is a diagram for explaining a non-limiting example of display of slope way part.
Figure 30:
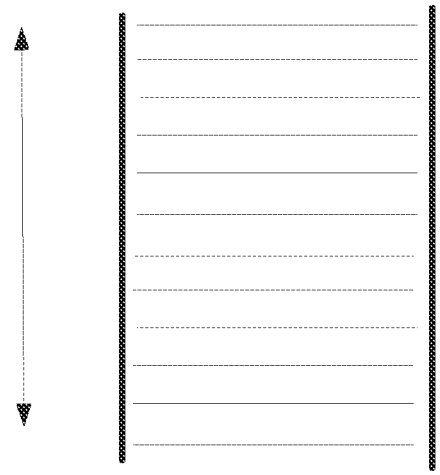
FIG. 30 is a diagram for explaining a non-limiting example of display of slope way part.
Figure 31:
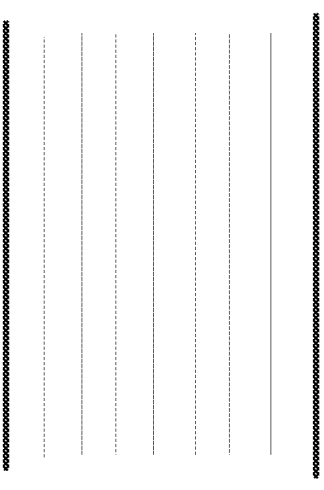
FIG. 31 is a diagram for explaining a non-limiting example of display of slope way part.

Other than the above, on the map image in this game, a "slope way" part is displayed as follows. If the slope way part on the map object is simply displayed as a map image, this part can be displayed as shown in FIG. 29. Such display has a problem that it is difficult to grasp the slope direction. Therefore, in this game, as shown in FIG. 30 and FIG. 31, the slope way part on the map object is displayed with lines added in accordance with the slope direction, more specifically, orthogonally to the slope direction. In the example shown in FIG. 30, a plurality of lines in the transverse direction are displayed. In this case, the slope way is sloped along the longitudinal direction in FIG. 30. In FIG. 31, a plurality of lines in the longitudinal direction are displayed. In this case, the slope way is sloped along the transverse direction in FIG. 31. Thus, the player can more easily grasp the condition of the slope way on the map object.

As described above, in this game, a map image is provided so as to allow the player to more accurately grasp the conditions in the virtual game space, thereby enhancing convenience for the player and amusement of the game.

Next, with reference to FIG. 32 to FIG. 35, operation of the game apparatus 101 in the exemplary embodiment will be described in more detail.

(Data Stored in Game Apparatus)

Figure 32:
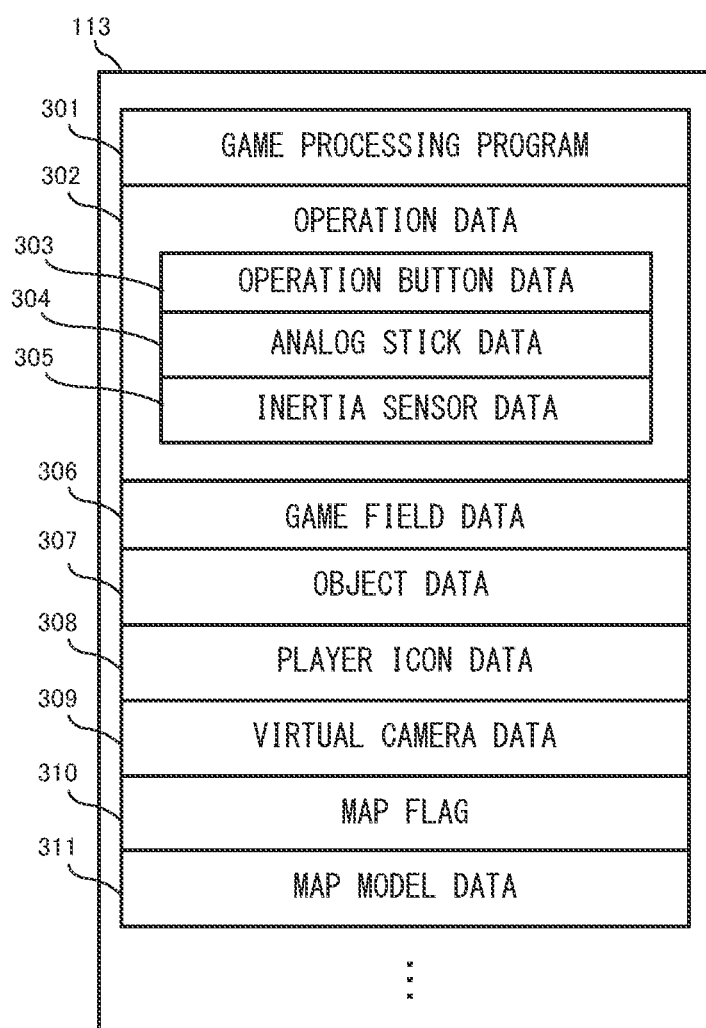
FIG. 32 shows a non-limiting example of a program and information stored in a main memory 113 of the game apparatus 101.

FIG. 32 shows an example of a program and information stored in the main memory 113 of the game apparatus 101. The main memory 113 stores a game processing program 301, operation data 302, game field data 306, object data 307, player icon data 308, virtual camera data 309, a map flag 310, map model data 311, and the like.

The game processing program 301 is a program for executing a game process according to the exemplary embodiment. Specifically, the game processing program 301 is a program for executing a process shown in a flowchart in FIG. 33 described later.

The operation data 302 is data indicating various operations performed to the game apparatus 101. The operation data 302 includes operation button data 303, analog stick data 304, and inertia sensor data 305. The operation button data 303 is data indicating the details of operations performed to the left operation buttons 104L, the right operation buttons 104R, the L button, the R button, the ZL button, and the ZR button, and indicates the pressing states and the like of the respective buttons. The analog stick data 304 is data indicating the details of respective operations performed to the left analog stick 103L and the right analog stick 103R. The inertia sensor data 305 is acceleration data and angular velocity data outputted from the inertia sensor 117.

The game field data 306 is data defining the structure of a game field (map) for the competition game in the exemplary embodiment. On the basis of this data, various terrain objects are placed in the virtual game space, whereby a game field is generated.

The object data 307 is data indicating the position, the orientation, the current state (e.g., whether during a super jump or not), the current status (e.g., vitality and equipped weapon), and the like of each object such as the player object 201, the ally objects, and the like.

The player icon data 308 is data indicating the position (in the map space) of each player icon 252, the details of an image thereof, and the like.

The virtual camera data 309 is data indicating the positions, the directions (orientations), and the gaze points of the first virtual camera and the second virtual camera.

The map flag 310 is flag data indicating whether or not the map image is being displayed.

The map model data 311 is three-dimensional model data of the map object 251 described above. That is, a three-dimensional model of the map object 251 is generated on the basis of the map model data 311. In another embodiment, a three-dimensional model of the map object 251 may be generated on the basis of the game field data 306 described above, without providing the map model data 311.

(Details of Game Process)

Figure 33:
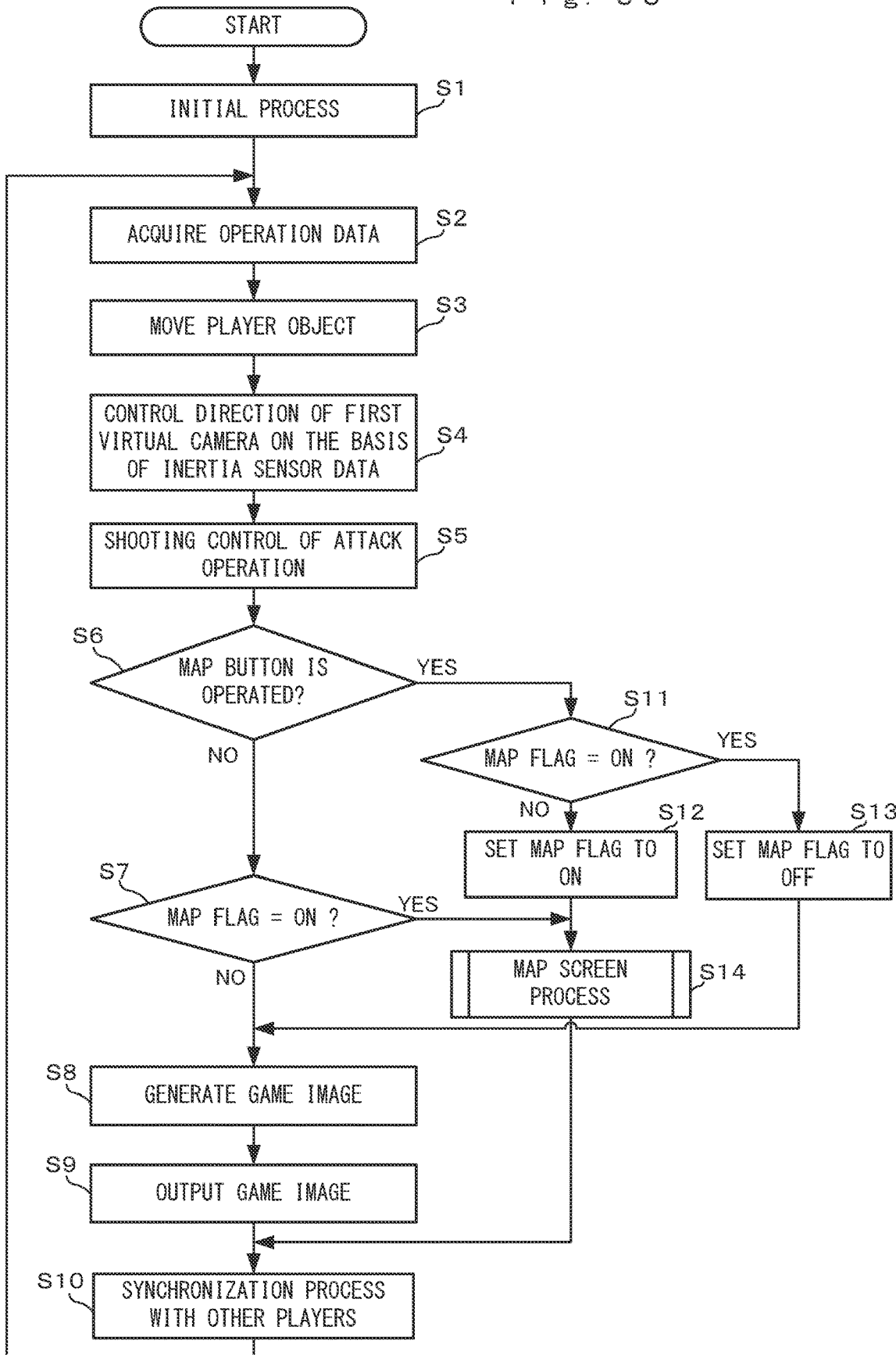
FIG. 33 is a flowchart showing the details of a non-limiting example of a game process according to the exemplary embodiment.

Next, with reference to the flowchart in FIG. 33, an example of the process executed by the processor section 111 of the game apparatus 101 will be described. The process shown in FIG. 33 is performed by the processor section 111 of the game apparatus 101 executing a predetermined information processing program (in this example, game program). It is noted that the processor section 111 repeatedly executes the process from step S2 to step S14 shown in FIG. 33, at predetermined time intervals (for example, every 1/60 second).

First, in step S1, the processor section 111 executes the initial process. Specifically, the following process is executed. First, on the basis of the game field data 306, the processor section 111 places various terrain objects and the like as a game field, in the virtual game space. Further, the processor section 111 places various objects such as the player object 201, ally objects, enemy objects, and the like as appropriate. In addition, the processor section 111 places the first virtual camera at a position behind the player object 201. Further, on the basis of the map model data 311, the processor section 111 generates a map object (terrain object) corresponding to the game field and places the map object in the map space. In addition, the processor section 111 places the second virtual camera above the map object, with the position and the direction thereof set as described above in FIG. 6. Then, the processor section 111 images the virtual game space by the first virtual camera and outputs the obtained image to the display section 116.

Next, in step S2, the processor section 111 acquires the operation data 302. In subsequent step S3, the processor section 111 moves the player object 201 in the virtual game space on the basis of the operation data 302. For example, the processor section 111 moves the player object 201 in accordance with the details of an operation to the left analog stick 103L indicated by the operation data 302. In addition, along with this movement, the processor section 111 moves the first virtual camera so as to follow the player object 201. It is noted that, if the player object 201 is currently performing a "super jump" described above, a process of continuing the movement of the super jump is executed until landing (until completion of super jump).

Next, in step S4, the processor section 111 controls the direction of the first virtual camera on the basis of the inertia sensor data 305. Specifically, the processor section 111 calculates the orientation of the game apparatus 101 on the basis of the inertia sensor data 305. Further, for example, the processor section 111 calculates the amount of change in the orientation from the previously calculated orientation, thereby changing the direction of the first virtual camera in accordance with the change in the orientation.

Next, in step S5, the processor section 111 executes control for an attack operation of the player object 201 on the basis of the operation button data 303 included in the operation data 302. For example, the processor section 111 determines whether or not an operation button for attack is pressed, and then if the operation button for attack is pressed, causes the player object 201 to perform an attack operation according to the weapon with which the player object 201 is currently equipped. For example, if the equipped weapon is a gun for shooting ink, a process of shooting an ink object toward the gaze point of the first virtual camera. Besides, a process of applying the ink object to a ground surface or a wall, and the like are executed as appropriate.

Next, in step S6, the processor section 111 determines whether or not a map button is operated, on the basis of the operation data 302. As a result, if the map button is not operated (NO in step S6), next, in step S7, the processor section 111 determines whether or not the map flag 310 is ON. That is, the processor section 111 determines whether or not the map image is currently being displayed. As a result of the determination, if the map flag 310 is ON (YES in step S7), the process proceeds to step S14 described later. On the other hand, if the map flag 310 is not ON (NO in step S7), in step S8, the processor section 111 generates a game image. Specifically, the processor section 111 images the virtual game space by the first virtual camera, to generate the game image.

Next, in step S9, the processor section 111 outputs the game image generated in step S8 to the display section 116. Then, the process proceeds to step S10 described later.

Next, a process to be performed in the case where the map button is determined to be operated in step S6 (YES in step S6) will be described. In this case, in step S11, the processor section 111 determines whether or not the map flag 310 is ON. As a result, if the map flag 310 is ON (YES in step S11), this means that the map button has been operated in a state in which the map image has been already displayed. Therefore, in step S13, the processor section 111 sets the map flag 310 to OFF. Then, the process proceeds to step S8.

On the other hand, if the map flag 310 is not ON (NO in step S11), in step S12, the processor section 111 sets the map flag 310 to ON. Subsequently, in step S14, the processor section 111 executes a map screen process.

Figure 34:
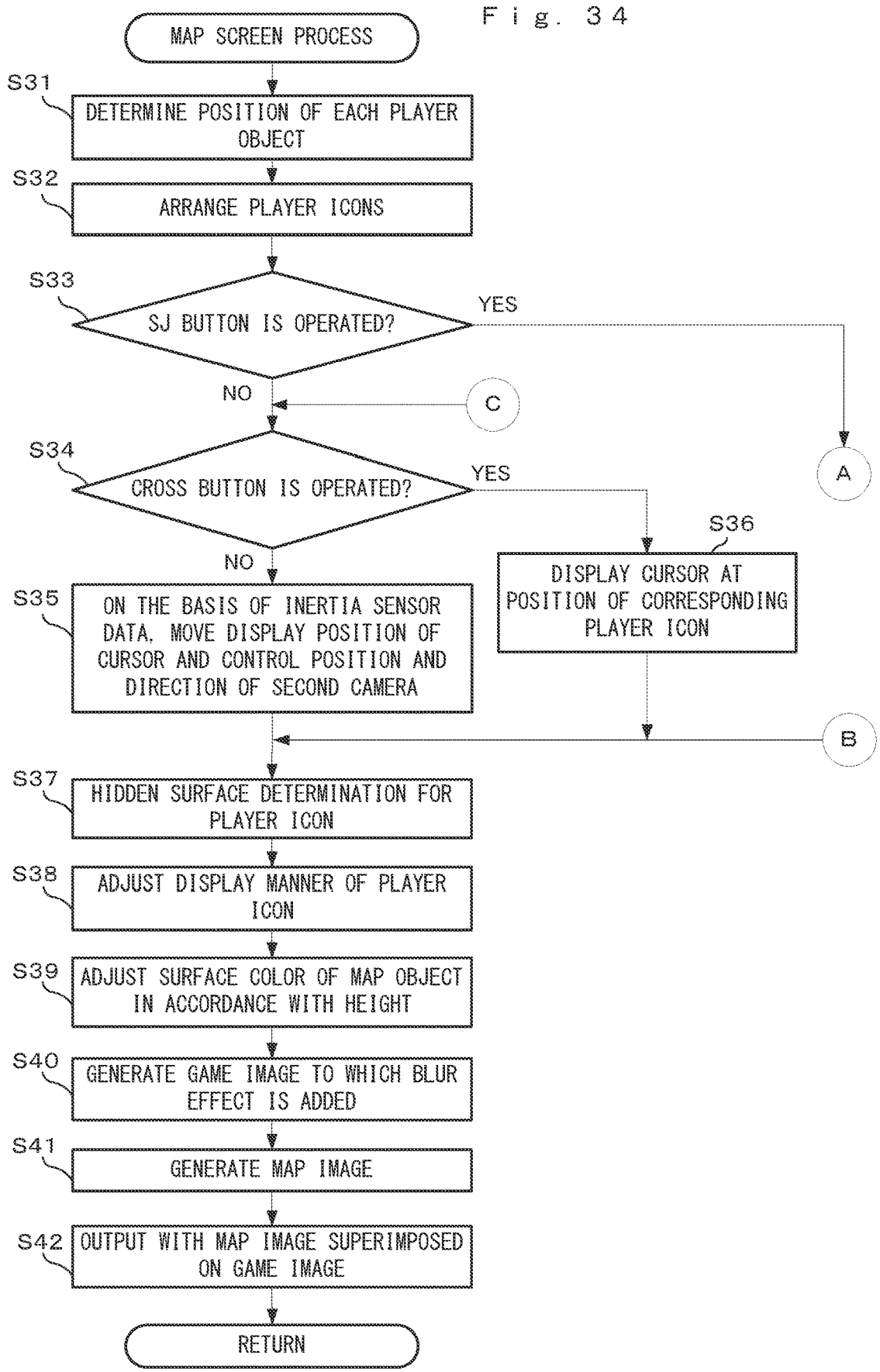
FIG. 34 is a flowchart showing the details of a non-limiting example of a map screen process.
Figure 35:
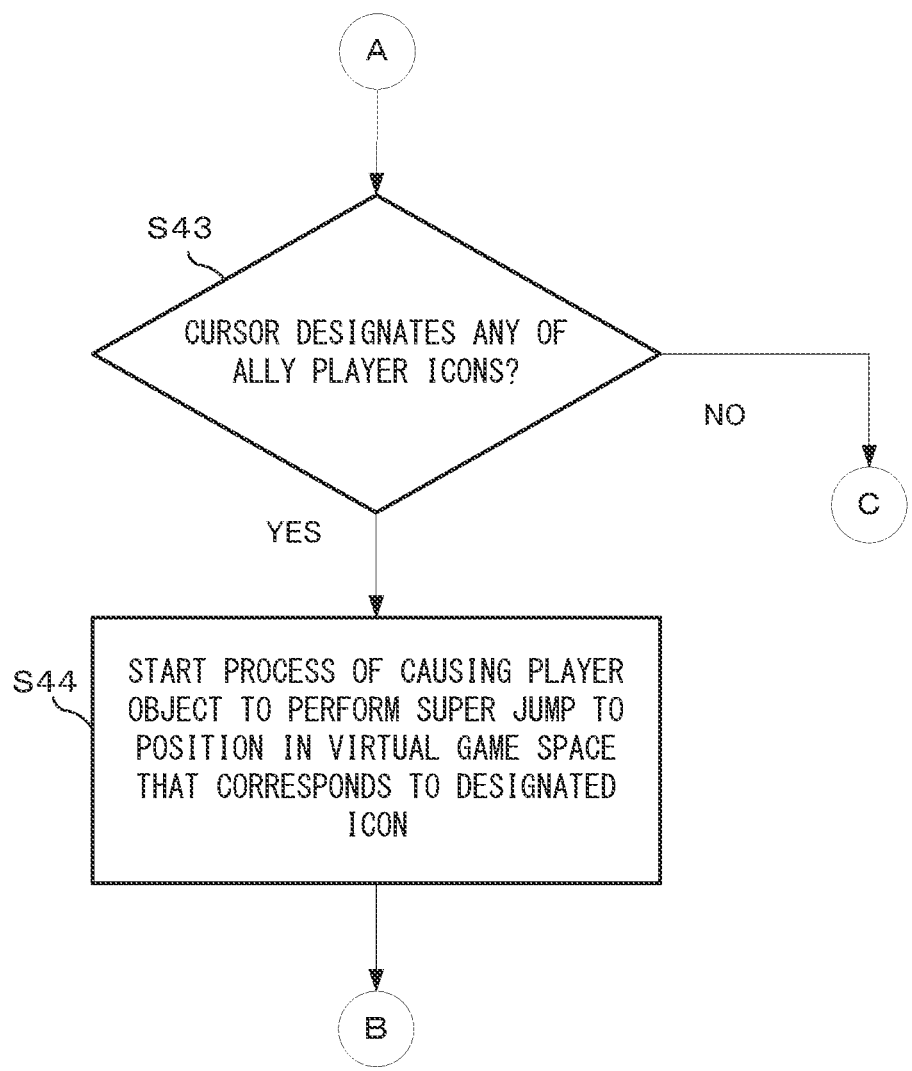
FIG. 35 is a flowchart showing the details of a non-limiting example of the map screen process.

FIG. 34 and FIG. 35 are flowcharts showing the details of the map screen process in step S14. In FIG. 34, first, in step S31, the processor section 111 determines the positions of the player object 201 and the ally objects in the virtual game space.

Next, in step S32, the processor section 111 places the player icons 252 at positions in the map object that correspond to the determined positions. That is, the processor section 111 places the player icons 252 corresponding to the respective objects, at the positions of the player object 201 and the ally objects in the virtual game space. As described above, the player icons 252 are placed such that the center points of the player icons 252 correspond to the position coordinates of the player object 201 and the ally objects.

Next, in step S33, the processor section 111 determines whether or not the SJ button is operated, by referring to the operation data 302. As a result, if the SJ button is operated (YES in step S33), in step S43 in FIG. 35, the processor section 111 determines whether or not the cursor 253 designates the player icon 252 (or icon indicating start point) corresponding to any of the ally objects. As a result, if any of the ally objects is not designated (NO in step S43), the process proceeds to step S34 described later. On the other hand, if the cursor 253 designates the player icon 252 corresponding to any of the ally objects (YES in step S43), in step S44, the processor section 111 sets the position of the designated ally object as a landing point, and starts a super jump as described above. It is noted that, if the super jump is already being performed, movement of the player object by the super jump is continued as it is. Then, the process proceeds to step S37 described later.

Returning to FIG. 34, as a result of the determination in step S33, if the SJ button is not operated (NO in step S33), next, in step S34, the processor section 111 determines whether or not the left operation button 104L is operated. As a result, if the left operation button 104L is not operated (NO in step S34), in step S35, the processor section 111 controls the display position of the cursor 253 on the basis of the inertia sensor data 305. Further, the processor section 111 controls also the position and the direction of the second virtual camera on the basis of the inertia sensor data 305. Then, the process proceeds to step S37. On the other hand, if the left operation button 104L is operated (YES in step S34), in step S36, the processor section 111 determines the direction of the operation and controls the cursor 253 so as to be displayed at the position of the player icon corresponding to the determined direction. For example, if the upper button of the left operation buttons 104L is pressed, the processor section 111 moves and displays the cursor 253 to the position of the player icon 252 corresponding to the first ally object (Player 2).

Next, in step S37, the processor section 111 performs hidden surface determination for each player icon 252. That is, the processor section 111 determines a part that is invisible by being hidden by an obstacle or the like when the player icon 252 is seen from the second virtual camera. For example, the part invisible from the second virtual camera is determined by performing determination as to the depth relationship of pixels of the player icon 252 using a Z buffer.

Next, in step S38, the processor section 111 executes a process of adjusting the display manner of the player icon 252 on the basis of a result of the hidden surface determination. That is, the processor section 111 executes, for each player icon 252, a process of causing the display manners of a part visible from the second virtual camera and a part invisible from the second virtual camera to be different from each other (see FIG. 21 to FIG. 26). In this game, the part invisible from the second virtual camera is adjusted so as to be displayed as a silhouette image. As other examples of change in the display manner, a part invisible from the second virtual camera may be displayed in a different color, or the outline of the player icon may be displayed by a dotted line. In addition, for example, a part visible from the second virtual camera and a part invisible from the second virtual camera may be displayed with different transmittances.

Next, in step S39, the processor section 111 executes a process of adjusting the colors of surfaces on the map object in accordance with their heights as described in FIG. 27 and FIG. 28. For example, the processor section 111 executes a process of adjusting parameters relevant to the colors of pixels at surface parts of the map object as appropriate in accordance with the heights of those parts. For example, in this process, for a part at a higher position, the brightness is increased to make the color tone brighter, whereas for a part at a lower position, the brightness is decreased to make the color tone darker. It is noted that the color parameter to be adjusted is not limited to the parameter relevant to brightness, but a parameter relevant to hue or saturation may be adjusted.

Next, in step S40, the processor section 111 generates a game image obtained by imaging the virtual game space by the first virtual camera. Further, the processor section 111 performs a blurring process on the obtained game image. Thus, a game image to which a blur effect is added is generated.

Next, in step S41, the processor section 111 generates an image obtained by imaging the map space (map object 251) by the second virtual camera. Further, the processor section 111 adds, to this image, the status image 254 and the list image 255 described above, thereby generating a map image as shown in FIG. 5.

Next, in step S42, the processor section 111 superimposes the map image generated in step S41 onto the game image generated in step S40. Then, the processor section 111 outputs the superimposition image to the display section 116. The reason why the game image is blurred when the map image is superimposed onto the game image as described above is as follows. When the map image is displayed being superimposed on the game image, the player can cause the player character to move or attack while confirming the map. Therefore, if the player can clearly view the game image while viewing the map, the game condition becomes too advantageous to the player. Therefore, in the exemplary embodiment, the game screen is blurred to adjust the game balance. The map screen process is thus finished.

Returning to FIG. 33, next to step S9 or step S14, in step S10, the processor section 111 executes a process for synchronizing the game state with the other game apparatuses 101. Since this game is a four-to-four team battle as described above, data indicating a result of the game process executed by the own game apparatus 101 are transmitted to the other game apparatuses that are performing the competition game, as appropriate, and meanwhile, receives similar data from the other game apparatuses 101. Then, a process of reflecting the received data in the own apparatus is executed. Thus, the positions and the operations of the ally objects and the enemy objects corresponding to the other players are reflected.

After step S10, the processor section 111 returns to step S2 to repeat the process.

The above process is merely an example. For example, the order of the above steps may be changed, some of the steps may be omitted, or another step may be added.

As described above, in the exemplary embodiment, when the map button is pressed, the map image is displayed being superimposed on the game image. Then, on the map image, each player icon 252 is displayed such that the display manners of a part visible from the second virtual camera and a part that is hidden (by the map object) and invisible from the second virtual camera are different from each other. Thus, the player can grasp the positions of the player objects more accurately. In addition, since the color expression is adjusted in accordance with the height on the map object, the player can also easily grasp height-direction information about the terrain. That is, it is possible to provide the player with a map image that allows information in the virtual game space to be grasped more accurately.

In another embodiment, instead of using such a three-dimensional model map object 251 as described above, the map image may be displayed as a two-dimensional image. For example, two-dimensional image of an overhead-view map may be used. Further, in this case, data defined with regard to the height in the map may be prepared separately, and a process of determining the positional relationship in the height direction may be performed using the data.

In the above exemplary embodiment, control is performed such that the map image display is switched on or off every time the map button is pressed. However, in another embodiment, the map image may be always displayed. For example, the map image may be always displayed at the upper right on the screen. Alternatively, one of the game image and the map image may be selectively displayed.

In another embodiment, the game image and the map image may be outputted to separate display devices. That is, a double-screen configuration may be employed. For example, in a hand-held game apparatus having two screens, the game image may be displayed on one screen and the map image may be displayed on the other screen.

In the above exemplary embodiment, an example where the display manner is changed when the player icon is hidden by a terrain object (map object) has been shown. However, in another embodiment, the display manner may be changed also when the player icon is hidden by an object other than a terrain object. That is, also when a view from the second virtual camera toward the player icon 252 is obstructed by a predetermined object other than a terrain object, the display manner of that invisible part may be changed. For example, it is assumed that, on the map image, the player icons different in elevation are displayed at such positions as to overlap each other. That is, also when one player icon (part thereof) is hidden by another player icon, the display manner of the part that is invisible by being hidden may be changed.

In the above example, regarding display of the player icon 252 on the map image, the display manners of a part visible from the second virtual camera and a part invisible from the second virtual camera are made different from each other. Instead, the invisible part (hidden part) may be controlled so as not to be displayed. In this case, if the entire player icon is hidden, it becomes difficult to recognize the position of the player icon. Therefore, basically, it is preferable that the entire image of the player icon is always displayed while the display manner is changed as described above.

In the above exemplary embodiment, the case where a sequential process for displaying the map image on which the display manner of the player icon is adjusted is executed in a single apparatus, has been described. In another embodiment, the sequential process may be executed in an information processing system including a plurality of information processing apparatuses. For example, in an information processing system including a terminal apparatus and a server apparatus communicable with the terminal apparatus via a network, a part of the sequential process may be executed by the server apparatus. Alternatively, in an information processing system including a terminal apparatus and a server apparatus communicable with the terminal apparatus via a network, a major process of the sequential process may be executed by the server apparatus, and a part of the sequential process may be executed by the terminal apparatus. In addition, in the information processing system, a system on the server side may be formed from a plurality of information processing apparatuses, and a process to be executed on the server side may be executed being shared by the plurality of information processing apparatuses.

The process according to the exemplary embodiment may be provided as a computer-readable storage medium having stored therein a game program that can realize the game process according to the above exemplary embodiment. For example, the process according to the exemplary embodiment may be provided by a magnetic medium such as a flash memory, a ROM, or a RAM, or an optical medium such as a CD-ROM, a DVD-ROM, or a DVD-RAM.

What is claimed is:

1. A computer-readable non-transitory storage medium having stored therein an information processing program to be executed by a computer of an information processing apparatus which executes an information process on the basis of user's operation to an operation section and displays an image on a display section, the information processing program causing the computer to execute:

generating a first image by imaging a first three-dimensional virtual space including a predetermined object by a first virtual camera;

generating a map object representing the first three-dimensional virtual space and formed by a three-dimensional model corresponding to the first three-dimensional virtual space, and placing the map object in a second three-dimensional virtual space;

placing, on the map object, an indicator object indicating a position of the predetermined object in the first three-dimensional virtual space;

generating a second image by imaging the second three-dimensional virtual space including the map object on which the indicator object is placed, by a second virtual camera;

displaying the first image and the second image on the display section; and controlling an imaging direction of the first virtual camera and an imaging direction of the second virtual camera on the basis of user's operation to the operation section.

2. The computer-readable non-transitory storage medium of claim 1, wherein:

the second image is generated such that, regarding the indicator object placed on the map object, display manners of a part hidden by the map object and a part not hidden by the map object as seen from the second virtual camera are different from each other.

3. The computer-readable non-transitory storage medium of claim 1, wherein:

an area of the indicator object on the second image is larger than an area occupied by the predetermined object corresponding to the indicator object on an image of an overhead view of the first three-dimensional virtual space.

4. The computer-readable non-transitory storage medium of claim 1, the information processing program further causing the computer to execute:
controlling a position and/or an imaging direction of the second virtual camera on the basis of user's operation to the operation section.

5. The computer-readable non-transitory storage medium of claim 4, the information processing program further causing the computer to execute:
controlling an imaging direction of the first virtual camera on the basis of user's operation to the operation section, wherein
the control of the second virtual camera and the control of the first virtual camera are executed simultaneously.

6. The computer-readable non-transitory storage medium of claim 4, the information processing program further causing the computer to execute:
displaying a cursor image indicating a designating position on the second image so as to be superimposed on the second image, on the basis of user's operation to the operation section, wherein
the control of the second virtual camera and control of the designating position of the cursor, based on user's operation to the operation section, are executed simultaneously.

7. The computer-readable non-transitory storage medium of claim 3, wherein, wherein:
the information processing apparatus further includes, as the operation section, an inertia sensor for detecting a motion applied to the information processing apparatus itself, and
the control of the second virtual camera is executed on the basis of output from the inertia sensor.

8. The computer-readable non-transitory storage medium of claim 1, wherein:
the second image is generated such that a parameter relevant to at least one of hue, brightness, and saturation of a surface part of the map object is changed in accordance with a height of the surface part on the map object.

9. The computer-readable non-transitory storage medium of claim 1, wherein:
the first image and the second image are simultaneously displayed on the display section in accordance with a predetermined user's operation.

10. The computer-readable non-transitory storage medium of claim 9, wherein:
the first image and the second image are simultaneously displayed by the second image being superimposed on the first image in accordance with the predetermined user's operation.

11. The computer-readable non-transitory storage medium of claim 1, wherein:
an image obtained by imaging the first three-dimensional virtual space by perspective projection is generated as the first image, and
an image obtained by imaging the second three-dimensional virtual space by orthogonal projection is generated as the second image.

12. An information processing apparatus control method to be executed by a computer for controlling an information processing apparatus which displays an image on a predetermined display section, the computer executing:
generating a first image by imaging a first three-dimensional virtual space including a predetermined object by a first virtual camera;
generating a map object representing the first three-dimensional virtual space and formed by a three-dimensional model corresponding to the first three-dimensional virtual space, and placing the map object in a second three-dimensional virtual space;
placing, on the map object, an indicator object indicating a position of the predetermined object in the first three-dimensional virtual space;
generating a second image by imaging the second three-dimensional virtual space including the map object on which the indicator object is placed, by a second virtual camera;
displaying the first image and the second image on the display section; and
controlling an imaging direction of the first virtual camera and an imaging direction of the second virtual camera on the basis of user's operation to the operation section.

13. An information processing system comprising:
a display configured to display a predetermined image;
a processing system that includes at least one hardware processor and a memory storing computer executable instructions that, when executed by the at least one hardware processor, are configured to cause the processing system to perform operations comprising:
generating a first image by imaging a first three-dimensional virtual space including a predetermined object by a first virtual camera;
generating a map object representing the first three-dimensional virtual space and formed by a three-dimensional model corresponding to the first three-dimensional virtual space, and placing the map object in a second three-dimensional virtual space;
placing, on the map object, an indicator object indicating a position of the predetermined object in the first three-dimensional virtual space;
generating, using a second virtual camera, a second image by imaging the second three-dimensional virtual space including the map object on which the indicator object is placed;
outputting, to the display, the first image and the second image; and
controlling an imaging direction of the first virtual camera and an imaging direction of the second virtual camera on the basis of user controlled operations.

14. An information processing apparatus comprising:
a first image generation section configured to generate a first image by imaging a first three-dimensional virtual space including a predetermined object by a first virtual camera;
a map object generation section configured to generate a map object representing the first three-dimensional virtual space and formed by a three-dimensional model corresponding to the first three-dimensional virtual space, and place the map object in a second three-dimensional virtual space;
an indicator object placing section configured to place, on the map object, an indicator object indicating a position of the predetermined object in the first three-dimensional virtual space;
a second image generation section configured to generate a second image by imaging the second three-dimensional virtual space including the map object on which the indicator object is placed, by a second virtual camera;

a display control section configured to display the first image and the second image on a predetermined display section; and
a virtual camera operation section configured to control an imaging direction of the first virtual camera and an imaging direction of the second virtual camera on the basis of user's operation to the operation section.

\* \* \* \* \*